(12) United States Patent
Tanigawa

(10) Patent No.: US 9,694,323 B2
(45) Date of Patent: Jul. 4, 2017

(54) ENERGY RECOVERY APPARATUS

(71) Applicant: DMW Corporation, Tokyo (JP)

(72) Inventor: Yoshiteru Tanigawa, Shizuoka (JP)

(73) Assignee: DMW CORPORATION, Ota-Ku, Tokyo (JP)

( * ) Notice: Subject to any disclaimer, the term of this patent is extended or adjusted under 35 U.S.C. 154(b) by 949 days.

(21) Appl. No.: 13/628,876

(22) Filed: Sep. 27, 2012

(65) Prior Publication Data

US 2013/0264253 A1    Oct. 10, 2013

(30) Foreign Application Priority Data

Oct. 20, 2011  (JP) .................................. 2011-230357

(51) Int. Cl.
*B01D 61/06*    (2006.01)

(52) U.S. Cl.
CPC ................... *B01D 61/06* (2013.01)

(58) Field of Classification Search
CPC ........ B01D 61/02; B01D 61/06; B01D 61/08; B01D 61/10; B01D 61/12; C02F 1/265; C02F 1/441

USPC .................................................... 210/91, 137
See application file for complete search history.

(56) References Cited

U.S. PATENT DOCUMENTS

| | | | |
|---|---|---|---|
| 5,797,429 A * | 8/1998 | Shumway .............. | B01D 61/06 137/625.69 |
| 2009/0110563 A1* | 4/2009 | Takita .................... | B01D 61/06 417/53 |

* cited by examiner

*Primary Examiner* — Robert Clemente
*Assistant Examiner* — Akash Varma
(74) *Attorney, Agent, or Firm* — Fay Kaplun & Marcin, LLP

(57) ABSTRACT

Two cylinder devices are respectively connected to two flow path switching devices; first and second position detectors which detect movement and passage of a piston are disposed at one end side of the two cylinder devices; and third and fourth position detectors are disposed at an interval more toward the one end side. The cylinder device in the filling process is set to the pressure feeding process by a flow path switching device in accordance with signals of the first and second position detectors of the cylinder device in the pressure feeding process, and the cylinder device in the pressure feeding process is subsequently set to the filling process by a flow path switching device in accordance with signals of the third and fourth position detectors.

7 Claims, 10 Drawing Sheets

$X (X = 2 \times Xb + 3 \times Xc + Xa + Xd)$ $S (S = Xb + Xc)$

US 9,694,323 B2

ENERGY RECOVERY APPARATUS

PRIORITY CLAIM

The present invention claims priority to JP Patent Appln. Serial No. 2011-230357 filed on Oct. 20, 2011; the entire specification of this application is incorporated hereby by reference.

BACKGROUND OF THE INVENTION

Field of the Invention

The present invention relates to an energy recovery apparatus which uses a water treatment system of the reverse osmosis method in order to desalinate seawater, or obtain clean water from polluted water.

Description of the Related Art

Reverse osmosis is known as one method for producing fresh water from seawater. This reverse osmosis method applies to seawater a pressure that is higher than the osmotic pressure of seawater (approximately 2.5 MPa) in a direction that is opposite to the direction of exertion of the osmotic pressure, conducts filtration with a semipermeable membrane (reverse osmosis membrane), and separates fresh water by removal of salts from the seawater. The seawater in which salts have been condensed and from which freshwater has been separated flows out from a membrane separation device while maintaining high pressure energy. A variety of energy recovery apparatuses have been practically applied in order to effectively utilize the high pressure energy possessed by this outflowing condensed seawater.

One example of a conventional energy recovery apparatus in a seawater desalination system of the reverse osmosis method is described with reference to FIG. 8 to FIG. 11G. FIG. 8 is a schematic view which shows the configuration and water flow of a conventional example of an energy recovery apparatus used in a seawater desalination system, and shows a condition where a first cylinder device is in a pressure feeding process, and a second cylinder device is in the filling process. FIG. 9 is a schematic view of FIG. 8, and shows a condition where the first cylinder device is in the filling process, and a second cylinder device is in the pressure feeding process. FIG. 10 is a diagram which shows the structure of a conventional flow path switching device of FIG. 8. FIGS. 11A-11G are schematic views which show operational relationships between the flow path switching device and the pressure feeding process and filling process of the conventional first and second cylinder devices of FIG. 8.

In FIG. 8, the pressure of seawater that is taken in by a water intake pump 1 serving as the water supply means is increased by a high-pressure pump 2 (to 5-7 MPa in this example), and is sent to a membrane separation device 3 to be separated into condensed seawater 4 and fresh water 5. The separated fresh water 5 runs into a storage tank (not illustrated). On the other hand, the high-pressure condensed seawater 4 which flows out from an outlet 23 of the membrane separation device 3 flows into a flow path switching device 6 from an intake port 6a, flows into the other end of a first cylinder device 7a connected to a first inflow/outflow port 6b of the flow path switching device 6, and moves a piston 8a under high pressure in the direction of the arrow marks. The low-pressure seawater inside the first cylinder device 7a is compressed by the movement of the piston 8a, raising its pressure. This seawater flows out from a first communication port 9 at one end, and flows into a booster pump 11 that serves as a pressure boosting means via a flow path direction regulation device 10 configured with four check valves, where it is raised in pressure to the same discharge pressure as the high-pressure pump 2, after which it is merged with high-pressure seawater from the high-pressure pump 2, fed to the membrane separation device 3, and separated into high-pressure condensed seawater 4 and fresh water 5.

The filling process in a second cylinder device 7b is conducted in parallel with the aforementioned pressure feeding process of the first cylinder device 7a. The seawater taken in by the water intake pump 1 is supplied to one end of the second cylinder device 7b from a second communication port 12 via the flow path direction regulation device 10, and moves a piston 8b in the direction of the arrow marks. The low-pressure condensed seawater in the second cylinder device 7b is pushed out by the movement of the piston 8b, flows into the flow path switching device 6 from a second inflow/outflow port 6c of the flow path switching device 6, and is discharged from a second outflow port 6e to a drainage path 60. The piston 8a of the first cylinder device 7a in the pressure feeding process moves to the flow path direction regulation device 10 side, and when the piston 8a is detected by a first position detector 13a provided at the one end side, a first signal is transmitted from the first position detector 13a to a controller 14. Upon receiving this first signal, the controller 14 sends a switching signal to a drive device 15 of the flow path switching device 6, whereupon the flow path of the flow path switching device 6 is switched.

As a result of the flow path switching of this flow path switching device 6, the second cylinder device 7b is switched to the pressure feeding process, and the first cylinder device 7a is switched to the filling process, as shown in FIG. 9. The high-pressure condensed seawater 4 which flows out from the outlet 23 of the membrane separation device 3 flows into the other end of the second cylinder device 7b which communicates with the second inflow/outflow port 6c of the flow path switching device 6, and moves the piston 8b under high pressure in the direction of the arrow marks. The low-pressure seawater in the second cylinder device 7b is compressed by the movement of the piston 8b, raising its pressure. This seawater flows out from one end from the second communication port 12, flows into the booster pump 11 via the flow path direction regulation device 10, merges with high-pressure seawater from the high-pressure pump 2 under the same discharge pressure as the high-pressure pump 2, and runs into the membrane separation device 3.

The filling process in the first cylinder device 7a is conducted in parallel with the pressure feeding process of this second cylinder device 7b. The seawater taken in by the water intake pump 1 is supplied to one end of the first cylinder device 7a from the first communication port 9 via the flow path direction regulation device 10, and moves the piston 8a in the direction of the arrow marks. The low-pressure condensed seawater in the first cylinder device 7a is pushed out by the movement of the piston 8a, flows into the flow path switching device 6 from the first inflow/outflow port 6b of the flow path switching device 6, and is discharged from the first outflow port 6d to the drainage path 60. The piston 8b of the second cylinder device 7b in the pressure feeding process moves to the flow path direction regulation device 10 side, and when the piston 8b is detected by a second position detector 13b provided at the one end side, a second signal is transmitted from the second position detector 13b to the controller 14. Upon receiving this second signal, the controller 14 sends a switching signal to the drive device 15 of the flow path switching device 6, whereupon the flow path of the flow path switching device 6 is switched.

By alternately switching the first cylinder device 7a and the second cylinder device 7b between the pressure feeding process and the filling process in this manner, and by continuously conducting this alternate switching, energy recovery can be effectively conducted. The pertinent energy recovery apparatus is disclosed in U.S. Pat. No. 5,797,429.

As shown in FIG. 10, with respect to the conventional flow path switching device 6 used in FIG. 8 and FIG. 9, there is sequential disposition of the second outflow port 6e, second inflow/outflow port 6c, intake port 6a, first inflow/outflow port 6b, and first outflow port 6d in a single cylinder 16. The first outflow port 6d and the second outflow port 6e communicate with the drainage path 60, the intake port 6a communicates with the outlet 23 of the membrane separation device 3, the first inflow/outflow port 6b communicates with the other end of the first cylinder device 7a, and the second inflow/outflow port 6c communicates with the other end of the second cylinder device 7b. Furthermore, there is provision of a first piston 17a which causes blockage and communication between the first outflow port 6d and the first inflow/outflow port 6b as well as blockage and communication between the first inflow/outflow port 6b and the intake port 6a, and a second piston 17b which causes blockage and communication between the second outflow port 6e and the second inflow/outflow port 6c as well as blockage and communication between the second inflow/outflow port 6c and the intake port Ga. This first piston 17a and second piston 17b are connected by a piston rod 18, and the piston rod 18 is configured to connect to the drive device 15.

The operations of the conventional flow path switching device 6 of the pertinent configuration are described with reference to FIGS. 11A-11G. With respect to FIG. 11A, the first cylinder device 7a is in the pressure feeding process, and the second cylinder device 7b is in the filling process. The first piston 17a blocks communication of the first inflow/outflow port 6b and the first outflow port 6d, the intake port 6a communicates with the first inflow/outflow port 6b, and the high-pressure condensed seawater 4 flows into the first cylinder device 7a. The second piston 17b blocks communication of the intake port 6a and the second inflow/outflow port 6c, the second inflow/outflow port 6c communicates with the second outflow port 6e, and the low-pressure seawater in the second cylinder device 7b drains into the drainage path 60. FIG. 11B shows the condition where the piston 8a is detected by the first position detector 13a of the first cylinder device 7a, the piston rod 18 moves leftward from the right side of the page so that the flow path switching device 6 switches, and the second inflow/outflow port 6c is obstructed by the second piston 17b. In FIG. 11C, the piston rod 18 moves further, the second inflow/outflow port 6c is completely obstructed by the second piston 17b, and the second inflow/outflow port 6c and the second outflow port 6e are blocked while the second inflow/outflow port 6c and the intake port 6a remain blocked. In this state, the first inflow/outflow port 6b is not yet obstructed by the first piston 17a. Now, when the first inflow/outflow port 6b is obstructed by the first piston 17a in a state where the second inflow/outflow port 6c is blocked by the second piston 17b, the inflow of high-pressure condensed seawater 4 into the intake port 6a is interrupted, and a high-pressure load is exerted upon the membrane separation device 3, which entails the risk of damage to the reverse osmosis membrane, and occurrence of vibration and noise in the flow path switching device 6 and its piping, and which also results in a decline in energy recovery efficiency. Then, as in FIG. 11D, the first inflow/outflow port 6b starts to be obstructed by the first piston 17a, and to the extent that the flow rate of inflowing high-pressure condensed seawater 4 is reduced by contraction of flow path area, obstruction of the second inflow/outflow port 6c by the second piston 17b is cleared with expansion of flow path area, and the flow rate of high-pressure condensed seawater 4 flowing into the second inflow/outflow port 6c increases. By this means, without hindering the flow of high-pressure condensed seawater 4 that flows into the intake port 6a, there is prevention of damage to the reverse osmosis membrane, and occurrence of vibration and noise in the flow path switching device 6 and its piping, and there is also improvement in energy recovery efficiency. When, as a result of further movement of the piston rod 18 as in FIG. 11E, the first inflow/outflow port 6b is completely obstructed by the first piston 17a, blocking communication between the first inflow/outflow port 6b and the intake port 6a, the second inflow/outflow port 6c and the intake port 6a come into full communication by displacement of the second piston 17b. As a result of further movement of the piston rod 18 as in FIG. 11F, obstruction of the first inflow/outflow port 6b by the first piston 17a is cleared, and the first inflow/outflow port 6b and the first outflow port 6d come into communication in a small flow path area, and as a result of still further movement of the piston rod 18 as in FIG. 11G, obstruction of the first inflow/outflow port 6b by the first piston 17a is completely cleared, and the first inflow/outflow port 6b and the first outflow port 6d communicate. By the switching of the flow path switching device 6 which moves the piston rod 18 rightward from the left side of the page by a first signal from this first position detector 13a, the first cylinder device 7a now enters the filling process, and the second cylinder device 7b enters the pressure feeding process. By the switching of the flow path switching device 6 which moves the piston rod 18 leftward from the right side of the page by a second signal from the second position detector 13b, the first cylinder device 7a now again enters the pressure feeding process, and the second cylinder device 7b enters the filling process.

With respect to the flow path switching device 6 in the above-described conventional energy recovery apparatus, as shown in FIG. 10, if the width of the intake port 6a is X1, the widths of the first inflow/outflow port 6b and second inflow/outflow port 6c are identical at X2, the widths of the first piston 17a and second piston 17b are identical at X3, and the width of the first outflow port 6d is X4, in order for the first piston 17a and second piston 17b to move from the condition indicated by the solid lines to the condition indicated by the broken lines, it is necessary that the cylinder 16 have the length of X1+2×X2+6×X3+X4. The width X3 of the first piston 17a and second piston 17b is set larger than the width X2 of the first inflow/outflow port 6b and second inflow/outflow port 6c. This is in order that there will be complete obstruction when the first inflow/outflow port 6b and second inflow/outflow port 6c are respectively obstructed by the first piston 17a and second piston 17b. If interstices occur without complete obstruction, there is a risk that the high-pressure condensed seawater 4 of the intake port 6a would flow to the first outflow port 6d and second outflow port 6e. The stroke of the piston rod 18 requires only X2+2×X3. The width of the first inflow/outflow port 6b and the width of the second inflow/outflow port 6c are identically set to X2, and the width of the first piston 17a and the width of the second piston 17b are identically set to X3 so that high-pressure condensed seawater 4 will similarly flow into the first cylinder device 7a and second cylinder device 7b.

The above-described conventional energy recovery apparatus has the feature that energy exchange can be continuously conducted, because high-pressure condensed seawater 4 continuously flows into the intake port 6a at a constant fixed flow rate without interruption, and the first inflow/outflow port 6b that communicates with the first cylinder device 7a and the second inflow/outflow port 6c that communicates with the second cylinder device 7b are not simultaneously obstructed. However, in the transition period of flow path changeover of the flow path switching device 6, there is abrupt fluctuation in the flow rate and pressure of the high-pressure condensed seawater 4, vibration and noise occurs, and the reverse osmosis membrane may be damaged due to such factors as the change in flow path and the responsiveness of the check valves used in the flow path direction regulation means 10. The efficiency of energy recovery also declines.

As it is necessary to provide five ports in a cylinder 16 of a single flow path switching device 6, the cylinder 16 and the piston rod 18 lengthen in the axial direction, and it is difficult to machine with satisfactory precision the inner diameter of the cylinder 16, and the outer diameter of the first piston 17a and second piston 17b fixed to the piston rod 18. Furthermore, due to the lengthened stroke of the piston rod 18 of the flow path switching device 6, the drive device 15 (using, for example, a hydraulic cylinder or the like) which drives the piston rod 18 is enlarged. Moreover, as the cylinder 16 is long in the axial direction, it is necessary to accelerate the travel speed of the first piston 17a and the second piston 17b, and accelerate flow path switching speed, but pressure fluctuations within the flow path switching device 6 are increased by acceleration of switching speed, giving rise to vibration and noise, and shortening the life of the flow path switching device 6, with the additional result that the size of the overall energy recovery apparatus increases, and a large installation space is required

SUMMARY OF THE INVENTION

The present invention was made in light of the circumstances of a conventional energy recovery apparatus as described above, and provides an energy recovery apparatus with improved energy recovery efficiency but without occurrence of noise and vibration and without damage to the reverse osmosis membrane by a configuration wherein one cylinder device is switched to the pressure feeding process before the other cylinder device terminates the pressure feeding process, whereby, during switching, a first inflow/outflow port that communicates with a first cylinder device and a second inflow/outflow port that communicates with a second cylinder device are temporarily fully opened at the same time, and abrupt fluctuations in the flow rate and pressure of high-pressure condensed seawater do not occur.

The energy recovery apparatus of the present invention is configured such that: one end of a first cylinder device and one end of a second cylinder device conduct intake from a liquid supply means and outflow to a pressure boosting means via a flow path direction regulation means; the other end of the first cylinder device communicates with an inflow/outflow port of a first flow path switching device; the other end of the second cylinder device communicates with an inflow/outflow port of a second flow path switching device; respective intake ports of the first flow path switching device and the second flow path switching device communicate with an outlet of high-pressure condensed seawater of a membrane separation device; respective outflow ports of the first flow path switching device and the second flow path switching device communicate with a drainage path; a first judgment means is provided in the first cylinder device which emits a signal upon judging that a piston of the first cylinder device has moved from the other end side to the one end side to a specified position; a second judgment means is provided in the second cylinder device which emits a signal upon judging that a piston of the second cylinder device has moved from the other end side to the one end side to a specified position; a first switching judgment means is provided which judges that a flow path of the first flow path switching device has been switched so that the other end of the first cylinder device comes into communication with the outlet of the membrane separation device from a condition of communication with the drainage path; a second switching judgment means is provided which judges that a flow path of the second flow path switching device has been switched so that the other end of the second cylinder device comes into communication with the outlet of the membrane separation device from a condition of communication with the drainage path; when a flow path of the second flow path switching device switches according to the signal of the first judgment means so that the other end of the second cylinder device comes into communication with the outlet of the membrane separation device from a condition of communication with the drainage path, and when it is judged by the second switching judgment means that a flow path of the second flow path switching device has been switched so that the other end of the second cylinder comes into communication with the outlet of the membrane separation device from a condition of communication with the drainage path, the flow path of the first flow path switching device switches so that the other end of the first cylinder device comes into communication with the drainage path from a condition of communication with the outlet of the membrane separation device by blockage thereof; and when a flow path of the first flow path switching device switches according to the signal of the second judgment means so that the other end of the first cylinder device comes into communication with the outlet of the membrane separation device from a condition of communication with the drainage path, and when it is judged by the first switching judgment means that the flow path of the first flow path switching device has been switched so that the other end of the first cylinder comes into communication with the outlet of the membrane separation device from a condition of communication with the drainage path, the flow path of the second flow path switching device switches so that the other end of the second cylinder device comes into communication with the drainage path from a condition of communication with the outlet of the membrane separation device by blockage thereof.

The energy recovery apparatus of the present invention can also be configured such that: one end of a first cylinder device and one end of a second cylinder device conduct intake from a liquid supply means and outflow to a pressure boosting means via a flow path direction regulation means; the other end of the first cylinder device communicates with an inflow/outflow port of a first flow path switching device; the other end of the second cylinder device communicates with an inflow/outflow port of a second flow path switching device; respective intake ports of the first flow path switching device and the second flow path switching device communicate with an outlet of high-pressure condensed seawater of a membrane separation device; respective outflow ports of the first flow path switching device and the second flow path switching device communicate with a drainage path; a first position detector, which emits a signal upon detecting a piston of the first cylinder device, is disposed on the outer wall of the first cylinder device on the one end side; a third position detector, which emits a signal upon detecting the piston, is disposed on the outer wall of the first cylinder device at a position that is closer to the one end side than the first position detector at an interval in the direction of movement of the piston; a second position detector, which emits a signal upon detecting a piston of the second cylinder device, is disposed on the outer wall of the second cylinder device on the one end side; a fourth position detector, which emits a signal upon detecting the piston, is disposed on the outer wall of the second cylinder device at a position that is closer to the one end side than the second position detector at an interval in the direction of movement of the piston; by means of a controller, a flow path of the second flow path switching device is switched so that the other end of the second cylinder device comes into communication with the outlet of the membrane separation device from a condition of communication with the drainage path, in accordance with the signal of the first position detector which detects that the piston of the first cylinder device has moved from the other end side to the one end side; by means of the controller, a flow path of the first flow path switching device is switched so that the other end of the first cylinder device comes into communication with the drainage path from a condition of communication with the outlet of the membrane separation device by blockage thereof, in accordance with the signal of the third position detector which detects that the piston of the first cylinder device has moved from the other end side to the one end side; by means of the controller, a flow path of the first flow path switching device is switched so that the other end of the first cylinder device comes into communication with the outlet of the membrane separation device from a condition of communication with the drainage path, in accordance with the signal of the second position detector which detects that the piston of the second cylinder device has moved from the other end side to the one end side; and by means of the controller, a flow path of the second flow path switching device is switched so that the other end of the second cylinder device comes into communication with the drainage path from a condition of communication with the outlet of the membrane separation device by blockage thereof, in accordance with the signal of the fourth position detector which detects that the piston of the second cylinder device has moved from the other end side to the one end side.

The energy recovery apparatus of the present invention can also be configured such that: one end of a first cylinder device and one end of a second cylinder device conduct intake from a liquid supply means and outflow to a pressure boosting means via a flow path direction regulation means; the other end of the first cylinder device communicates with an inflow/outflow port of a first flow path switching device; the other end of the second cylinder device communicates with an inflow/outflow port of a second flow path switching device; respective intake ports of the first flow path switching device and the second flow path switching device communicate with an outlet of high-pressure condensed seawater of a membrane separation device; respective outflow ports of the first flow path switching device and the second flow path switching device communicate with a drainage path; a first clocking initiation position detector, which emits a signal upon detecting a piston of the first cylinder device, is disposed on the outer wall of the first cylinder device; positions P1 and P3 are established at intervals L1 and L3 on the one end side from the first clocking initiation position detector; a second clocking initiation position detector, which emits a signal upon detecting a piston of the second cylinder device, is disposed on the outer wall of the second cylinder device; positions P2 and P4 are established at intervals L2 and L4 on the one end side from the second clocking initiation position detector; a flow rate measurement means is provided which measures the flow rate of high-pressure condensed seawater that flows out from the outlet of the membrane separation device; a moving speed of each piston is obtained from a flow rate measured by this flow rate measurement means and the respective cylinder cross-sectional area of the first cylinder device and the second cylinder device; times t1, t2, t3, and t4 required to move the distances L1, L2, L3, and L4 are computed in advance from the moving speed, and stored in a controller; by means of the controller, clocking is initiated according to the signal of the first clocking initiation position detector which detects that the piston of the first cylinder device has moved from the other end side to the one end side, and upon clocking of the time t1, a flow path of the second flow path switching device is switched so that the other end of the second cylinder device comes into communication with the outlet of the membrane separation device from a condition of communication with the drainage path in accordance with a first switching signal from the controller, and upon clocking of the time t3, a flow path of the first flow path switching device is switched so that the other end of the first cylinder device comes into communication with the drainage path from a condition of communication with the outlet of the membrane separation device by blockage thereof in accordance with a third switching signal from the controller; by means of the controller, clocking is initiated according to the signal of the second clocking initiation position detector which detects that the piston of the second cylinder device has moved from the other end side to the one end side, and upon clocking of the time t2, a flow path of the first flow path switching device is switched so that the other end of the first cylinder device comes into communication with the outlet of the membrane separation device from a condition of communication with the drainage path in accordance with a second switching signal from the controller, and upon clocking of the time t4, a flow path of the second flow path switching device is switched so that the other end of the second cylinder device comes into communication with the drainage path from a condition of communication with the outlet of the membrane separation device by blockage thereof in accordance with a fourth switching signal from the controller.

Furthermore, the energy recovery apparatus of the present invention can also be configured such that: one end of a first cylinder device and one end of a second cylinder device conduct intake from a liquid supply means and outflow to a pressure boosting means via a flow path direction regulation means; the other end of the first cylinder device communicates with an inflow/outflow port of a first flow path switching device; the other end of the second cylinder device communicates with an inflow/outflow port of a second flow path switching device; respective intake ports of the first flow path switching device and the second flow path switching device communicate with an outlet of high-pressure condensed seawater of a membrane separation device; respective outflow ports of the first flow path switching device and the second flow path switching device communicate with a drainage path; a first position detector, which emits a signal upon detecting a piston of the first cylinder device, is disposed on the outer wall of the first cylinder device on the one end side; a second position detector, which emits a signal upon detecting a piston of the second cylinder device, is disposed on the outer wall of the second cylinder device on the one end side; by means of a controller, clocking of a first time is initiated according to the signal of the first position detector which detects that the piston of the first cylinder device has moved from the other end side to the one end side, and a flow path of the second flow path switching device is switched so that the other end of the second cylinder device comes into communication with the outlet of the membrane separation device from a condition of communication with the drainage path; upon clocking of the first time by the controller, a flow path of the first flow path switching device is switched so that the other end of the first cylinder device comes into communication with the drainage path from a condition of communication with the outlet of the membrane separation device by blockage thereof; by means of a controller, clocking of a second time is initiated according to the signal of the second position detector which detects that the piston of the second cylinder device has moved from the other end side to the one end side, and a flow path of the first flow path switching device is switched so that the other end of the first cylinder device comes into communication with the outlet of the membrane separation device from a condition of communication with the drainage path; and upon clocking of the second time by the controller, a flow path of the second flow path switching device is switched so that the other end of the second cylinder device comes into communication with the drainage path from a condition of communication with the outlet of the membrane separation device by blockage thereof.

Moreover, it can also be configured such that: one end of a first cylinder device and one end of a second cylinder device conduct intake from a liquid supply means and outflow to a pressure boosting means via a flow path direction regulation means; the other end of the first cylinder device communicates with an inflow/outflow port of a first flow path switching device; the other end of the second cylinder device communicates with an inflow/outflow port of a second flow path switching device; respective intake ports of the first flow path switching device and the second flow path switching device communicate with an outlet of high-pressure condensed seawater of a membrane separation device; respective outflow ports of the first flow path switching device and the second flow path switching device communicate with a drainage path; a first position detector, which emits a signal upon detecting a piston of the first cylinder device, is disposed on the outer wall of the first cylinder device on the one end side; a second position detector, which emits a signal upon detecting a piston of the second cylinder device, is disposed on the outer wall of the second cylinder device on the one end side; a first flow path switching detector, which detects that a flow path has been switched so that the other end of the first cylinder device has come into communication with the outlet of the membrane separation device from a condition of communication with the drainage path, is disposed in the first flow path switching device; a second flow path switching detector, which detects that a flow path has been switched so that the other end of the second cylinder device has come into communication with the outlet of the membrane separation device from a condition of communication with the drainage path, is disposed in the second flow path switching device; by means of a controller, when a flow path of the second flow path switching device switches so that the other end of the second cylinder device comes into communication with the outlet of the membrane separation device from a condition of communication with the drainage path in accordance with the signal of the first position detector which detects that the piston of the first cylinder device has moved from the other end side to the one end side, and when it is detected by the second flow path switching detector that the second flow path switching device has switched so that the other end of the second cylinder device comes into communication with the outlet of the membrane separation device from a condition of communication with the drainage path, a flow path of the first flow path switching device is switched so that the other end of the first cylinder device comes into communication with the drainage path from a condition of communication with the outlet of the membrane separation device by blockage thereof; and by means of the controller, when a flow path of the first flow path switching device switches so that the other end of the first cylinder device comes into communication with the outlet of the membrane separation device from a condition of communication with the drainage path in accordance with the signal of the second position detector which detects that the piston of the second cylinder device has moved from the other end side to the one end side, and when it is detected by the first flow path switching detector that switching has occurred in the first flow path switching device so that the other end of the first cylinder device comes into communication with the outlet of the membrane separation device from a condition of communication with the drainage path, a flow path of the second flow path switching device is switched so that the other end of the second cylinder device comes into communication with the drainage path from a condition of communication with the outlet of the membrane separation device by blockage thereof.

Moreover, it is also possible to have a configuration wherein a flow path switching speed of the first flow path switching device and the second flow path switching device decreases when the outlet of the membrane separation device communicates with the other end of the first cylinder device and the second cylinder device, and increases when communication of the outlet of the membrane separation device with the other end is blocked.

In addition, it is also possible to have a configuration wherein: the first flow path switching device and the second flow path switching device dispose the inflow/outflow port between the outflow port and the intake port; each cylinder is sequentially provided with one outflow port, one inflow/outflow port, one intake port, and one adjustment port; a first piston is provided which is positioned between the outflow port and the inflow/outflow port to block the outflow port and the inflow/outflow port, and which is positioned between the inflow/outflow port and the intake port to block the inflow/outflow port and the intake port; a second piston is provided which is positioned more toward the opposite side of the inflow/outflow port than the intake port in a condition where the first piston is positioned between the outflow port and the inflow/outflow port; the first piston and the second piston are connected by a piston rod; the piston rod is moved in the axial direction of the cylinder by connection of one end of the piston rod to a drive device; and the adjustment port is disposed at the end portion of the cylinder on the intake port side.

Moreover, a configuration can also be adopted wherein a thickness of the second piston in the axial direction of a cylinder is configured to be thinner than a thickness of the first piston in the axial direction of the cylinder.

According to the energy recovery apparatus of claim 1, as a flow path switching device is provided in each of the two cylinder devices, a judgment means which judges that a piston has reached a specified position is provided in each cylinder device, and switching judgment means are provided which judge that the respective flow path switching device has switched flow paths, it is possible to judge a position of a piston in the one cylinder device which is in the pressure feeding process, switch the flow path of the flow path switching means which is provided in the other cylinder device that is in the filling process prior to termination of the pressure feeding process by the one cylinder device, and switch the other cylinder device to the pressure feeding process. The reliability of the energy recovery apparatus is enhanced, because intake of high-pressure condensed water into the two flow path switching devices is not impeded, abrupt rises in pressure do not occur, vibration and noise do not occur, and damage to the membrane separation device is prevented. A flow path of the flow path switching device provided in the one cylinder device is switched when it is judged by the switching judgment means that the flow path switching device provided in the other cylinder device has switched flow paths, the one cylinder device is set to the filling process, and the two cylinder devices are alternately switched between the pressure feeding process and the filling process, enabling efficient energy recovery.

According to the energy recovery apparatus of claim 2, as there is a configuration wherein a flow path switching device is provided in each of the two cylinder devices, and two position detectors which detect specified positions of a piston are respectively provided in each of the two cylinder devices, when it is detected by one of the position detectors provided in the one cylinder device in the pressure feeding process that the piston has reached the specified position, it is possible to switch the flow path of the flow path switching means provided in the other cylinder device in the filling process prior to termination of the pressure feeding process by the one cylinder device, and switch the other cylinder device to the pressure feeding process without simultaneous obstruction of the intake ports of the two flow path switching devices. When it is then detected by the other position detector provided in the one cylinder device that the piston has reached the other specified position, it is judged that the flow path switching means provided in the other cylinder device has switched flow paths, the flow path of the flow path switching device provided in the one cylinder device is switched, the one cylinder device is set to the filling process, and the two cylinder devices are alternately switched between the pressure feeding process and the filling process, enabling efficient energy recovery.

According to the energy recovery apparatus of claim 3, a flow path switching device is provided in each of the two cylinder devices; a clocking initiation position detector which detects a specified position of a piston is provided in each of the two cylinder devices; two positions are respectively set at two intervals from this clocking initiation position detector; a flow rate measurement means is provided which measures a flow rate of high-pressure condensed water that flows out from the membrane separation device; the travel speed of each piston is obtained from the measured flow rate and the cylinder cross-sectional area; the times required to move from the specified position to the set positions are calculated in advance from these travel speeds, and respectively stored in the controller; it is judged that a piston has reached a set position when a prescribed time is clocked from the initiation of clocking upon detection by the clocking initiation position detector provided in the one cylinder device in the pressure feeding process; and the flow path of the flow path switching means provided in the other cylinder device in the filling process is switched prior to termination of the pressure feeding process by the one cylinder device, enabling switching of the other cylinder device to the pressure feeding process without simultaneous obstruction of the intake ports of the two flow path switching devices. Furthermore, when the other prescribed time is clocked, it is judged that the flow path switching means provided in the other cylinder device has switched flow paths, the flow path of the flow path switching device provided in the one cylinder device is switched, the one cylinder device is set to the filling process, and the two cylinder devices are alternately switched between the pressure feeding process and the filling process, enabling efficient energy recovery.

According to the energy recovery apparatus of claim 4, a flow path switching device is provided in each of the two cylinder devices; a position detector which detects a specified position of a piston is provided in each of the two cylinder devices; as a result of detection by the position detector provided in the one cylinder device in the pressure feeding process, the flow path of the flow path switching means provided in the other cylinder device in the filling process is switched prior to termination of the pressure feeding process by the one cylinder device, enabling switching of the other cylinder device to the pressure feeding process without simultaneous obstruction of the intake ports of the two flow path switching devices. By means of a controller, when clocking is started upon detection by the position detector, and when a prescribed time is clocked, it is judged that the flow path switching means provided in the other cylinder device has switched flow paths, the flow path of the flow path switching device provided in the one cylinder device is switched, the one cylinder device is set to the filling process, and the two cylinder devices are alternately switched between the pressure feeding process and the filling process, enabling efficient energy recovery.

According to the energy recovery apparatus of claim 5: a flow path switching device is provided in each of the two cylinder devices; a position detector which detects a specified position of a piston is provided in each of the two cylinder devices; and as a result of detection by the position detector provided in the one cylinder device in the pressure feeding process, the flow path of the flow path switching means provided in the other cylinder device in the filling process is switched prior to termination of the pressure feeding process by the one cylinder device, enabling switching of the other cylinder device to the pressure feeding process without simultaneous obstruction of the intake ports of the two flow path switching devices. As flow path switching detectors which detect flow path switching are respectively provided in the flow path switching devices, a flow path of the flow path switching device provided in the one cylinder device is switched when it is detected that a flow path of the flow path switching means provided in the other cylinder device has switched, the one cylinder device is set to the filling process, and the two cylinder devices are alternately switched between the pressure feeding process and the filling process, enabling efficient energy recovery. As the flow path switching detector detects that a flow path switching means has switched flow paths, detection can be reliably conducted.

With respect to the energy recovery apparatus of claim 6, as the flow path switching speed of a flow path switching device is such that switching is slowed when a flow path is switched to take high-pressure condensed water into a cylinder device, abrupt fluctuations in flow rate and pressure of the high-pressure condensed water do not arise, and vibration and noise do not occur even during the transition period of flow path switching.

With respect to the energy recovery apparatus of claim 7, the configuration is such that the stroke and the cylinder length of the flow path switching device can be shortened, because: the flow path switching device provides the inflow/outflow port between the outflow port and the intake port; each cylinder is sequentially provided with one outflow port, one inflow/outflow port, one intake port, and one adjustment port; there is provision of a first piston which is positioned between the outflow port and the inflow/outflow port to block these, and which is positioned between the inflow/outflow port and the intake port to block these, and a second piston which is positioned more toward the opposite side of the inflow/outflow port than the intake port in a condition where the first piston is positioned between the outflow port and the inflow/outflow port; the first piston and the second piston are connected by a piston rod, and the piston rod is moved in the axial direction by its connection to a drive device; and the adjustment port is provided at the end portion of the intake port side of the cylinder. By this means, the overall apparatus including the drive device can be made more compact, and installation space can be reduced. Moreover, as the length of the cylinder and the piston rod are shortened, precise machining of the inner diameter of the cylinder and the outer diameter of the piston is facilitated. In addition, as there is an intake port which always takes in high-pressure condensed seawater between the first piston and the second piston, the pressure of the condensed water is applied with an orientation opposed to the first piston and the second piston, and the piston rod can be operated with little force, without exertion of force that would bias the piston rod to one side in the axial direction due to the high pressure of the condensed water.

With respect to the energy recovery apparatus of claim 8, as the thickness of the second piston in the axial direction of the cylinder is configured to be thinner than the thickness of the first piston in the axial direction of the cylinder, the length of the cylinder can be shortened to the extent of the thinned portion, and the flow path switching device can be made more compact.

Further features of the present invention will become apparent from the following description of exemplary embodiments (with reference to the attached drawings).

DESCRIPTION OF THE EMBODIMENTS

Figure 1:
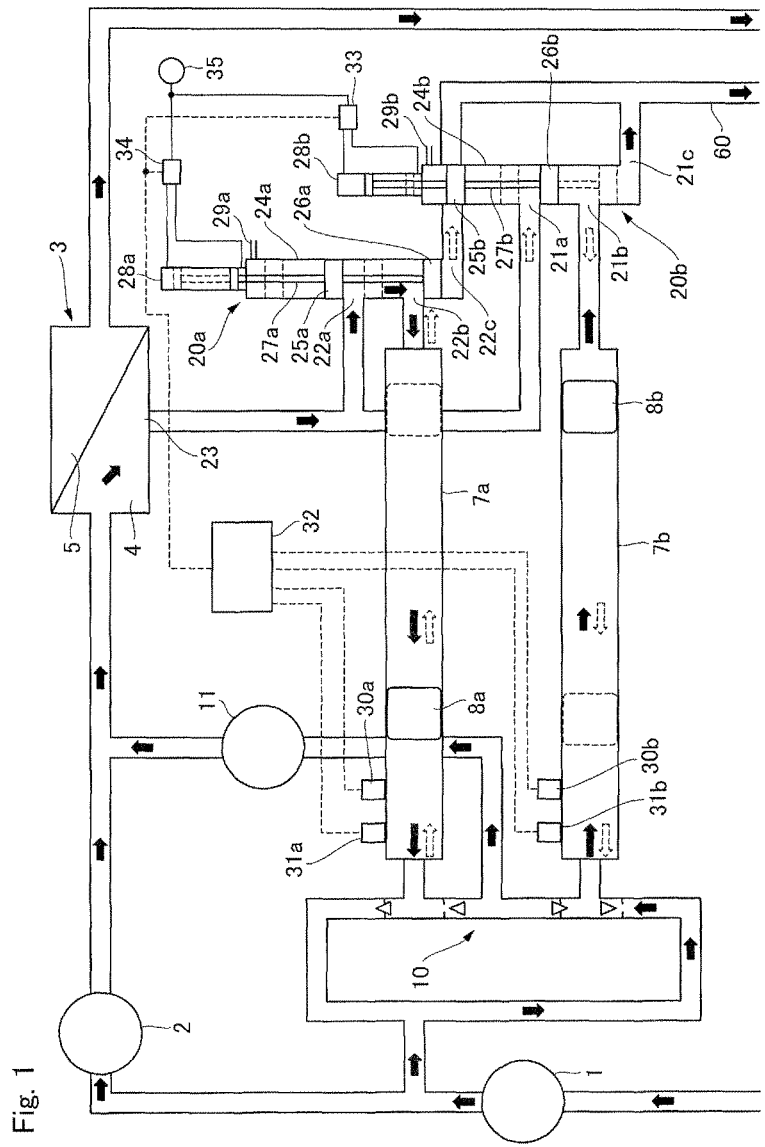
FIG. 1 is a schematic view of a first embodiment of the energy recovery apparatus of the present invention using a seawater desalination system, and shows a condition where a first cylinder device is in the pressure feeding process, and a second cylinder device is in the filling process.
Figure 2:
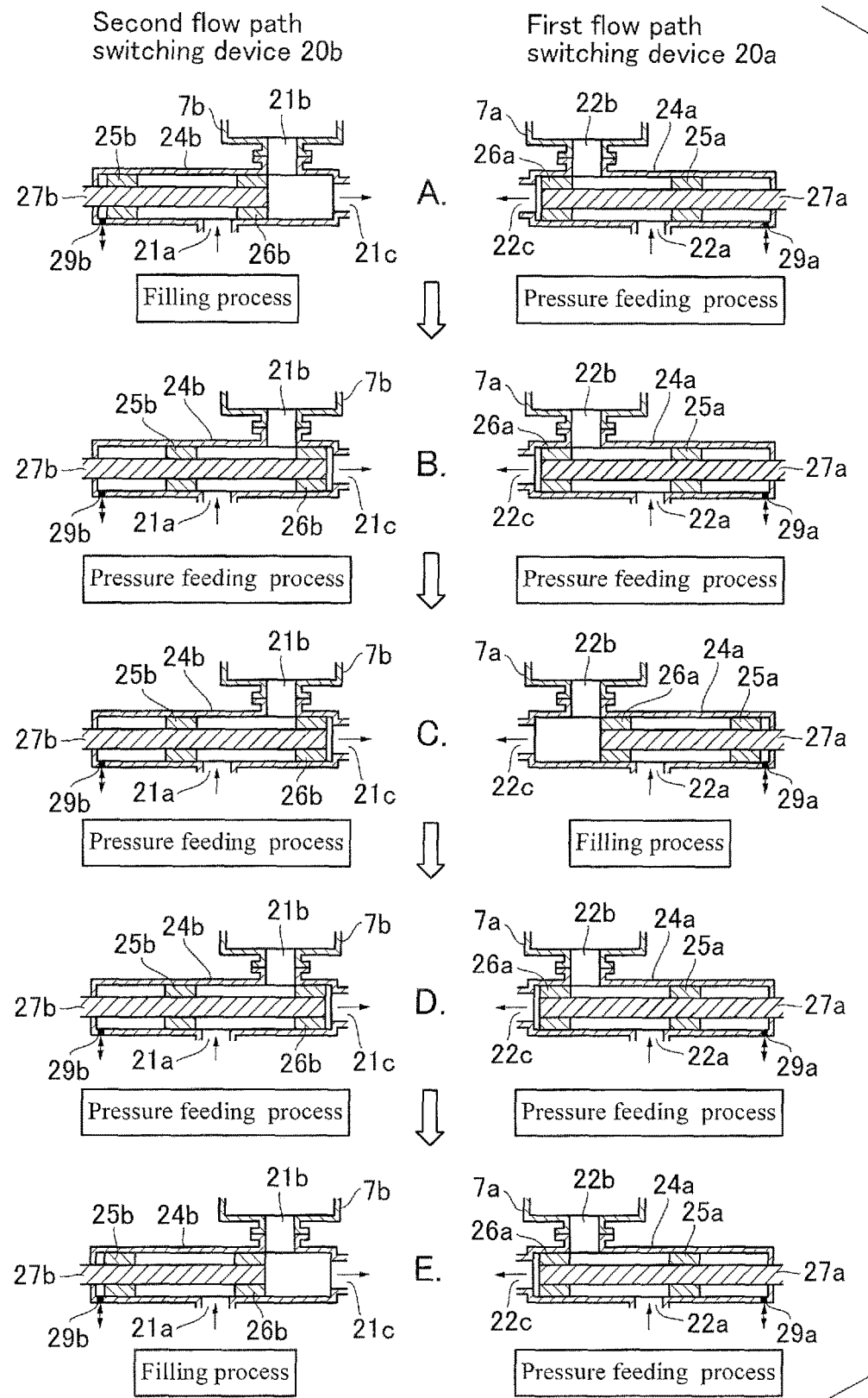
FIG. 2A-FIG. 2E are schematic drawings which show operational relationships between the first and second flow path switching devices and the pressure feeding process and the filling process of the first and second cylinder devices.
Figure 3:
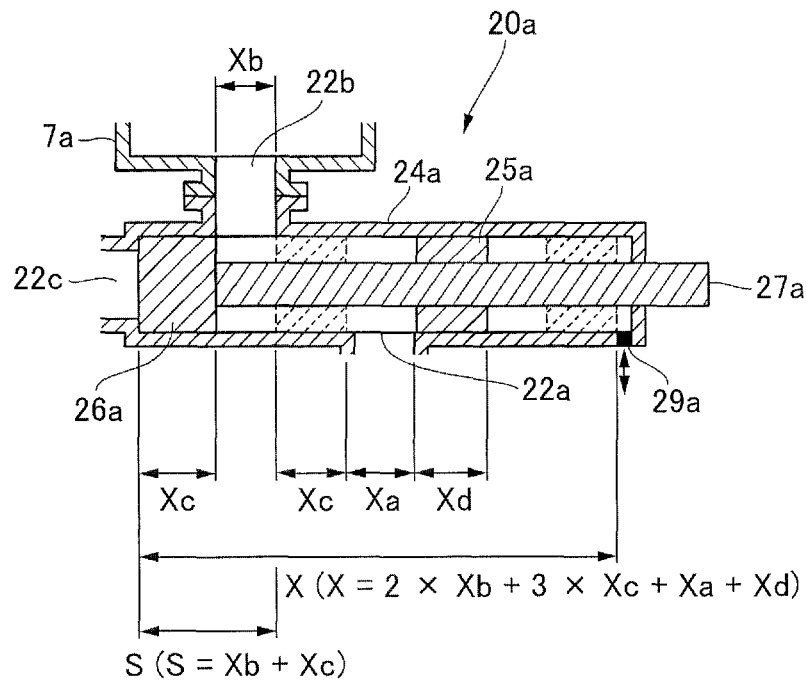
FIG. 3 shows the structure of a flow path switching device.
Figure 4:
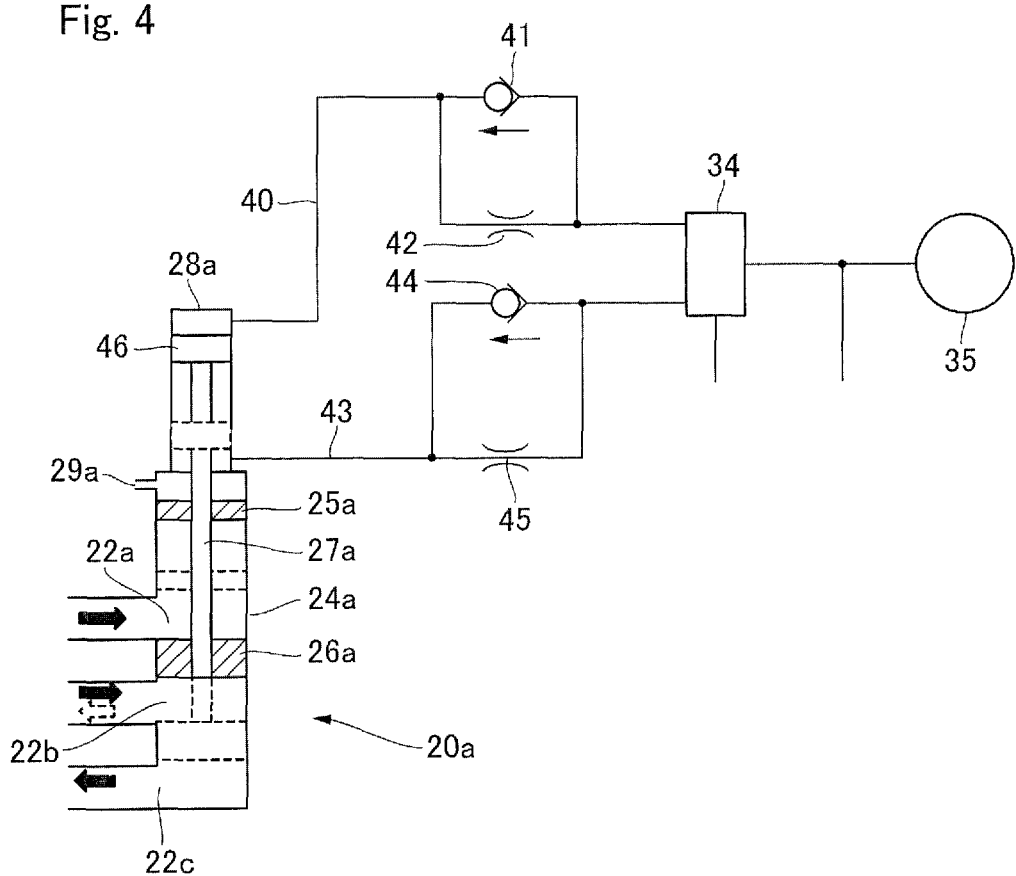
FIG. 4 is one example of a hydraulic flow path of a flow path switching device.

A first embodiment of the present invention is described with reference to FIG. 1 to FIG. 4. FIG. 1 is a schematic view of the first embodiment of the energy recovery apparatus of the present invention using a seawater desalination system, and shows a condition where the first cylinder device is in the pressure feeding process, and the second cylinder device is in the filling process. FIG. 2 is a schematic view which shows operational relationships between the first and second flow path switching devices and the pressure feeding process and the filling process of the first and second cylinder devices. FIG. 3 shows the structure of a flow path switching device. FIG. 4 is one example of a hydraulic flow path of a flow path switching device. In FIG. 1 to FIG. 4, the same reference symbols are assigned to members that are identical or equivalent to the conventional structure shown in FIG. 8 to FIG. 11G, and description thereof is omitted.

In the first embodiment of the present invention, the other end of the first cylinder device 7*a* communicates with an inflow/outflow port 22*b* of a first flow path switching device 20*a*, and the other end of the second cylinder device 7*b* communicates with an inflow/outflow port 21*b* of a second flow path switching device 20*b*. Moreover, an intake port 22*a* of the first flow path switching device 20*a* and an intake port 21*a* of the second flow path switching device 20*b* communicate with the outlet 23 of high-pressure condensed seawater 4 of the membrane separation device 3. Furthermore, outflow ports 22*c* and 21*c* of the first flow path switching device 20*a* and the second flow path switching device 20*b* respectively communicate with the drainage path 60. The first flow path switching device 20*a* disposes the inflow/outflow port 22*b* between the outflow port 22*c* and the intake port 22*a* in a cylinder 24*a*, and sequentially provides a single outflow port 22*c*, a single inflow/outflow port 22*b*, a single intake port 22*a*, and a single adjustment port 29*a* in the cylinder 24*a*. Inside the cylinder 24*a* are provided a first piston 26*a* which is positioned between the outflow port 22*c* and the inflow/outflow port 22*b* to block these, and which is positioned between the inflow/outflow port 22*b* and the intake port 22*a* to block these, and a second piston 25a which is positioned more toward the opposite side of the inflow/outflow port 22b than the intake port 22a in a condition where the first piston 26a is positioned between the outflow port 22c and the inflow/outflow port 22b. The first piston 26a and the second piston 25a are connected by a piston rod 27a. One end of the piston rod 27a communicates with a drive cylinder device 28a, and the piston rod 27a reciprocates inside the cylinder 24a in coordination with the driving of the drive cylinder device 28a. The adjustment port 29a is provided at the end of the intake port 22a side of the cylinder 24a.

The second flow path switching device 20b similarly disposes the inflow/outflow port 21b between the outflow port 21c and the intake port 21a in the cylinder 24b, and sequentially provides a single outflow port 21c, a single inflow/outflow port 21b, a single intake port 21a, and a single adjustment port 29b in the cylinder 24b. Inside the cylinder 24b are provided a first piston 26b which is positioned between the outflow port 21c and the inflow/outflow port 21b to block these, and which is positioned between the inflow/outflow port 21b and the intake port 21a to block these, and a second piston 25b which is positioned more toward the opposite side of the inflow/outflow port 21b than the intake port 21a in a condition where the first piston 26b is positioned between the outflow port 21c and the inflow/outflow port 21b. The first piston 26b and the second piston 25b are connected by a piston rod 27b. One end of the piston rod 27b communicates with a drive cylinder device 28b, and the piston rod 27b reciprocates inside the cylinder 24b in coordination with the driving of the drive cylinder device 28b. The adjustment port 29b is provided at the end of the intake port 21a side of the cylinder 24b.

Furthermore, a first position detector 30a is disposed on the outer wall of the first cylinder device 7a on the flow path direction regulation means 10 side, and a second position detector 30b is disposed on the outer wall of the second cylinder device 7b on the flow path direction regulation means 10 side. Moreover, a third position detector 31a is disposed on the outer wall of the first cylinder device 7a at a position that is more toward the flow path direction regulation means 10 side at an appropriate interval from the first position detector 30a in the direction of movement (from right to left in FIG. 1) of the piston 8a, and a fourth position detector 31b is disposed on the outer wall of the second cylinder device 7b at a position that is more toward the flow path direction regulation means 10 side at an appropriate interval from the second position detector 30b in the direction of movement (from right to left in FIG. 1) of the piston 8b. The signals of detection by the first to the fourth position detectors 30a, 30b, 31a, and 31b are transmitted to a controller 32. These first to the fourth position detectors 30a, 30b, 31a, and 31b are examples of magnetic proximity sensors, and detect the piston 8a or 8b when it moves into proximity, and emit signals. In accordance with the detection signals of the first to the fourth position detectors 30a, 30b, 31a, and 31b, the controller 32 does or does not apply voltage to electromagnetic valves 33 and 34 that switch the hydraulic flow paths of the drive cylinder devices 28a and 28b, or appropriately controls the direction of applied current. It should be noted that 35 is the hydraulic source of the hydraulic flow paths. When the first cylinder device 7a and the second cylinder device 7b are in the condition of the pressure feeding process in which the piston 8a or 8b moves from the other end side to the one end side (from right to left in the drawing), the controller 32 receives the signals of detection of the first to the fourth position detectors 30a, 30b, 31a, and 31b. The controller 32 can discriminate whether the first cylinder device 7a and the second cylinder device 7b are in the pressure feeding process or the filling process from the application or non-application of voltage to the electromagnetic valves 33 and 34, or the direction of the applied current.

When the first cylinder device 7a is in the pressure feeding process and the second cylinder device 7b is in the filling process as in FIG. 1, the piston 8a of the first cylinder device 7a is pressed by the high-pressure condensed seawater 4, and is moved in the direction from right to left per the drawing of the arrow marks (shown with solid lines). The low-pressure seawater inside the first cylinder device 7a then becomes high-pressure seawater that flows out to the flow path direction regulation means 10, whereby energy recovery is conducted. The piston 8b of the second cylinder device 7b is pressed by the low-pressure seawater that flows in from the flow path direction regulation means 10, and is moved in the direction from right to left per the drawing of the arrow marks; the energy inside the second cylinder device 7b is recovered, and the condensed seawater that has become low in pressure is discharged. When this first cylinder device 7a is in the pressure feeding process, and this second cylinder device 7b is in the filling process, with respect to the first and second flow path switching devices 20a and 20b, the first flow path switching device 20a is such that communication of the outflow port 22c and the inflow/outflow port 22b is blocked by the first piston 26a, the inflow/outflow port 22b and the intake port 22a are in communication, and high-pressure condensed seawater 4 flows into the first cylinder device 7a, as shown in FIG. 2A. As for the second flow path switching device 20b, the outflow port 21c and the inflow/outflow port 21b are in communication, low-pressure condensed seawater in the second cylinder device 7b flows out from the outflow port 21c, communication of the inflow port 21a and the inflow/outflow port 21b is blocked by the first piston 26b, and high-pressure condensed seawater 4 does not flow into the second cylinder device 7b. The piston 8a of the first cylinder device 7a is moved in the direction of the arrow mark as a result of being pressed by the high-pressure condensed seawater 4, and reaches the position of the first position detector 30a, where a signal of detection is transmitted from the first position detector 30a to the controller 32. When this occurs, the controller 32 transmits a switching signal to the electromagnetic valve 33, the hydraulic flow path of the electromagnetic valve 33 is switched, the drive cylinder device 28b is driven, and the piston rod 27b of the second flow path switching device 20b is moved in the axial direction, as in FIG. 2B, whereupon communication of the inflow/outflow port 21b and the outflow port 21c is blocked by the first piston 26b, the intake port 21a and the inflow/outflow port 21b come into communication, and the second cylinder device 7b also enters the condition of the pressure feeding process. In this condition of FIG. 2B, high-pressure condensed seawater 4 flows into both the first and second cylinder devices 7a and 7b. The flow of the high-pressure condensed seawater 4 is not impeded, and the pressure on the outlet 23 of the membrane separation device 3 does not abruptly rise. Furthermore, when the piston 8a of the first cylinder device 7a is moved further in the direction of the arrow mark, and reaches the position of the third position detector 31a, and when a signal of detection is transmitted from the third position detector 31a to the controller 32, the controller 32 now transmits a switching signal to the electromagnetic valve 34, the hydraulic flow path of the electromagnetic valve 34 is switched, the drive cylinder device 28a is driven, and the piston rod 27a of the first flow path switching device 20a is moved in the axial direction, as in FIG. 2C, whereupon communication of the intake port 22a and the inflow/outflow port 22b is blocked by the first piston 26a, the inflow/outflow port 22b and the outflow port 22c come into communication, and the first cylinder device 7a enters the condition of the filling process.

With respect to the second cylinder device 7b that has entered the pressure feeding process, the piston 8b is moved in the direction of the arrow marks with the broken lines as a result of being pressed by the high-pressure condensed seawater 4, and reaches the position of the second position detector 30b, where a signal of detection is transmitted from the second position detector 30b to the controller 32. When this occurs, the controller 32 transmits a switching signal to the electromagnetic valve 34, the hydraulic flow path of the electromagnetic valve 34 is switched, the drive cylinder device 28a is driven, and the piston rod 27a of the first flow path switching device 20a is moved in the axial direction, as in FIG. 2D, whereupon communication of the inflow/outflow port 22b and the outflow port 22c is blocked by the first piston 26a, the intake port 22a and the inflow/outflow port 22b come into communication, and the first cylinder device 7a again enters the condition of the pressure feeding process. In this condition of FIG. 2D, high-pressure condensed seawater 4 flows into both the first and second cylinder devices 7a and 7b. The flow of the high-pressure condensed seawater 4 is not impeded, and the pressure of the outlet 23 of the membrane separation device 3 does not abruptly rise. Furthermore, when the piston 8b of the second cylinder device 7b is moved further in the direction of the arrow marks with the broken lines, and reaches the position of the fourth position detector 31b, and when a signal of detection is transmitted from the fourth position detector 31b to the controller 32, the controller 32 now transmits a switching signal to the electromagnetic valve 33, the hydraulic flow path of the electromagnetic valve 33 is switched, the drive cylinder device 28b is driven, and the piston rod 27b of the second flow path switching device 20b is moved in the axial direction, as in FIG. 2E, whereupon communication of the intake port 21a and the inflow/outflow port 21b is blocked by the second piston 26b, the inflow/outflow port 21b and the outflow port 21c come into communication, and the second cylinder device 7b enters the condition of the filling process.

By repeatedly switching the first and second cylinder devices 7a and 7b alternately between the pressure feeding process and the filling process in the foregoing manner, it becomes possible to conduct continuous reverse osmotic filtration of seawater and energy recovery. With respect to the present invention, by providing a first flow path switching device 20a in the first cylinder device 7a, by providing a second flow path switching device 20b in the second cylinder device 7b, by detecting positions of the piston 8a of the first cylinder device 7a by the first and third position detectors 30a and 31a, and by detecting positions of the piston 8b of the second cylinder device 7b by the second and fourth position detectors 30b and 31b, the timing of flow path switching of the first and second flow path switching devices 20a and 20b can be appropriately controlled, and one cylinder device can be switched to the pressure feeding process before the other cylinder device terminates the pressure feeding process. The travel speed of the piston of the cylinder device in the pressure feeding process is restricted by the flow rate of the high-pressure condensed seawater 4 which close out from the outlet 23 of the membrane separation device 3. Moreover, the travel speed of the piston of the cylinder device in the filling process is determined by the discharge flow rate of the intake pump 1. By adjusting the discharge flow rate of the intake pump 1, the speed with which the piston of the cylinder device in the filling process moves toward and reaches the other end side becomes quicker than the speed with which the piston of the cylinder device in the pressure feeding process moves toward and reaches the one end side that communicates with the flow path direction regulation means 10.

With respect to the prior art, two inflow/outflow ports are provided in a single flow path switching device, and the two pistons and the two inflow/outflow ports are set up at intervals so that when one of the cylinder devices is switched to the pressure feeding process from the filling process, there is a 1:1 correspondence between the flow volume proportion of the increase of the inflowing high-pressure condensed seawater 4 at the inflow/outflow port communicating with the cylinder device that is switched to the pressure feeding process and the flow volume proportion of the decrease of the inflowing high-pressure condensed seawater 4 at the inflow/outflow port communicating with the other cylinder device that is switched to the filling process. Now, the aperture area of the two inflow/outflow ports during switching operations is set so as to equal the aperture area of one fully open inflow/outlet port. In contrast, with respect to the present invention, when the other cylinder device is switched to the pressure feeding process, the inflow/outflow port of the other flow path switching device is opened while the inflow/outflow port of the flow path switching device of the cylinder device that is in the pressure feeding process remains in a fully open condition, with the result that the two inflow/outflow ports 21b and 22b are simultaneously fully open, sufficient aperture areas of the inflow/outflow ports can be maintained with respect to the inflow of high-pressure condensed seawater 4, an abrupt rise in the pressure of the outlet 23 of the membrane separation device 3 does not occur, and abrupt fluctuations in flow rate and pressure do not arise even during the transition period of flow path switching.

The positional relationships of the pistons with the respective ports of the first and second flow path switching devices 20a and 20b used in the present invention, and the relationships of cylinder length and stroke with the width of the pistons and the respective ports are shown in FIG. 3 as exemplified by the first flow path switching device 20a. When the first cylinder device 7a is in the pressure feeding process, the intake port 22a and the inflow/outflow port 22b are in communication, and the first piston 26a is positioned at one end side of the cylinder 24a as shown by the solid lines. When in the filling process, the first piston 26a is positioned between the intake port 22a and the inflow/outflow port 22b as shown by the broken lines so that communication of the intake port 22a and the inflow/outflow port 22b is blocked, and the inflow/outflow port 22b and the outflow port 22c communicate. The outflow port 22c is provided at the end face of one end side of the cylinder 24a, and does not require cylinder length. The second piston 25a does not move to cover any of the ports, and may be positioned more toward the side opposite the inflow/outflow port 22b than the intake port 22a. As the second piston 25a does not move to cover any of the ports, it may be thinner than the width of the intake port 22a and the inflow/outflow port 22b. Furthermore, in order to discharge seawater that leaks out from the second piston 25a, the adjustment port 29a is provided at the other end side of the cylinder 24a.

With respect to the above-described first flow path switching device 20a used in the present invention, if the width of the intake port 22a is Xa, the width of the inflow/outflow port 22b is Xb, the width of the first piston 26a is Xc, and the width of the second piston 25a is Xd, it is sufficient if the stroke of the piston rod 27a is such that the first piston 26a can move from the position of the solid lines to the position of the broken lines, and a length of Xb+Xc suffices. Here, when the width Xc of the first piston 26a is not larger than the width Xb of the inflow/outflow port 22b, and when the first piston 26a is positioned at a position corresponding to the inflow/outflow port 22b, an interstice occurs without complete obstruction of the inflow/outflow port 22b, and the risk arises that the high-pressure condensed seawater 4 of the intake port 22a will flow to the outflow port 22c. Thus, it is necessary that Xc be larger than Xb for purposes of complete obstruction. The length of the cylinder 24a then becomes 2×Xb+3×Xc+Xa+Xd.

By shortening the length of the cylinder 24a and the stroke of the piston rod 27a of the flow path switching device 20a, the entire flow path switching device including the drive cylinder device 28a is made compact, and installation space is reduced. Moreover, as the length of the cylinder 24a and the piston rod 27a is shortened, precise machining of the inner diameter of the cylinder and the outer diameter of the piston is facilitated. As there is an intake port 22a which always takes in high-pressure condensed seawater 4 between the first piston 26a and the second piston 25a, the pressure of the high-pressure condensed seawater 4 is similarly applied with reverse orientation to the first piston 26a and the second piston 25a, no force is exerted by the pressure of the high-pressure condensed seawater 4 that would bias the piston rod 27a to one side in the axial direction, and the piston rod 27a can be operated with little force. Furthermore, as the thickness of the second piston 25a in the axial direction of the cylinder 24a is configured to be thinner than the thickness of the first piston 26a, the stroke and the length of the cylinder 24a can be shortened to the extent of the thinned portion, and the flow path switching device 20a can be reduced in size. The structure of the second flow path switching device 20b is identical, and duplicative description thereof is omitted.

In one example of the hydraulic flow paths of the first flow path switching device 20a used in the present invention, as shown in FIG. 4, a hydraulic pipe 40 is connected to one end side of the cylinder of the drive cylinder device 28a, and connects to the electromagnetic valve 34 via a check valve 41 and a flow rate adjustment valve 42 aligned in parallel. The check valve 41 is disposed with an orientation that causes flow of pressure oil into the drive cylinder device 28a. In addition, a hydraulic pipe 43 is connected to the other end side of the cylinder of the drive cylinder device 28a, and connects to the electromagnetic valve 34 via a check valve 44 and a flow rate adjustment valve 45 aligned in parallel. The check valve 44 is disposed with an orientation that blocks outflow of pressure oil from the drive cylinder device 28a. The electromagnetic valve 34 switches flow paths according to a control signal from the controller 32, and supplies pressure oil supplied from the hydraulic source 35 to the drive cylinder device 28a, and discharges returning oil from the drive cylinder device 28a to a storage tank. When pressure oil flows into the hydraulic pipe 40 at one end side of the cylinder of the drive cylinder device 28a, the piston rod 27a is moved so that from a condition where communication of the intake port 22a and the inflow/outflow port 22b is blocked, and the inflow/outflow port 22b and the outflow port 22c communicate, the first piston 26a causes communication of the intake port 22a and the inflow/outflow port 22b, and blocks communication of the inflow/outflow port 22b and the outflow port 22c. In addition, when pressure oil flows into the hydraulic pipe 43 at the other end side of the cylinder of the drive cylinder device 28a, the piston rod 27a is moved so that from a condition where communication of the inflow/outflow port 22b and the outflow port 22c is blocked, and the intake port 22a and the inflow/outflow port 22b communicate, the first piston 26a blocks communication of the intake port 22a and the inflow/outflow port 22b, and causes communication of the inflow/outflow port 22b, and the outflow port 22c.

With respect to the hydraulic flow paths of the first flow path switching device 20a shown in FIG. 4, pressure oil passes through the check valve 41 without flow rate regulation, and is supplied to the drive cylinder device 28a from the hydraulic pipe 40. As the flow rate of discharge is appropriately restricted by the flow rate adjustment valve 45, the travel speed of the first piston 26a is slowed, and the flow path switching of the first flow path switching device 20a is conducted deliberately. When the first cylinder device 7a is switched from the filling process to the pressure feeding process, the intake port 22a and the inflow/outflow port 22b gradually come into communication. Conversely, in the case of switching from the pressure feeding process to the filling process, the pressure oil supplied from the hydraulic pipe 43 to the drive cylinder device 28a passes through the check valve 44 without flow rate regulation, and is supplied to the drive cylinder device 28a. The flow rate of discharge is appropriately restricted by the flow rate adjustment valve 42, but it is set so that the amount of restriction is adjusted to be much less than the amount of restriction by the flow rate adjustment valve 45, and the travel speed of the first piston 26a is quick. Thus, the flow path switching of the first flow path switching device 20a is rapidly conducted, and when the first cylinder device 7a is switched from the pressure feeding process to the filling process, communication of the intake port 22a and the inflow/outflow port 22b is rapidly block, and the inflow/outflow port 22b and the outflow port 22c rapidly come into communication. With respect to the hydraulic flow paths of the first flow path switching device 20a of FIG. 4, as the flow path switching from the filling process to the pressure feeding process of the first cylinder device 7a is conducted slowly, abrupt fluctuations in flow rate and pressure do not occur even during the transition period of flow path switching in which high-pressure condensed seawater 4 is taken in. With respect to the hydraulic flow paths of the second flow path switching device 20b, the structure is identical, and duplicative description thereof is omitted. The flow path switching from the filling process to the pressure feeding process by the first cylinder device 7a must terminate before flow path switching from the pressure feeding process to the filling process is conducted by the second cylinder device 7b. Thus, the flow rate adjustment valves 42 and 45 are set so that the flow path switching of the second cylinder device 7b terminates by the time of detection of the piston 8a by the third position detector 31a after detection of the piston 8a by the first position detector 30a. Similarly, the flow rate adjustment valves 42 and 45 are set so that the flow path switching of the first cylinder device 7a terminates by the time of detection of the piston 8b by the fourth position detector 31b after detection of the piston 8b by the second position detector 30b.

With respect to the above-described first embodiment, the first position detector 30a and the controller 32 function as a first judgment means which emits a signal upon judging that the piston 8a of the first cylinder device 7a has moved from the other end side to the one end side to a specified position, and the second position detector 30b and the controller 32 function as a second judgment means which emits a signal upon judging that the piston 8b of the second cylinder device 7b has moved from the other end side to the one end side to a specified position. The third position detector 31a and the controller 32 function as a second switching judgment means which judges that the flow path of the second flow path switching device 20b has switched so that the other end of the second cylinder device 7b has come into communication with the outlet 23 of the membrane separation device 3 from a condition of communication with the drainage path 60, and the fourth position detector 31b and the controller 32 function as a first switching judgment means which judges that the flow path of the first flow path switching device 20a has switched so that the other end of the first cylinder device 7a has come into communication with the outlet 23 of the membrane separation device 3 from a condition of communication with the drainage path 60.

Figure 5:
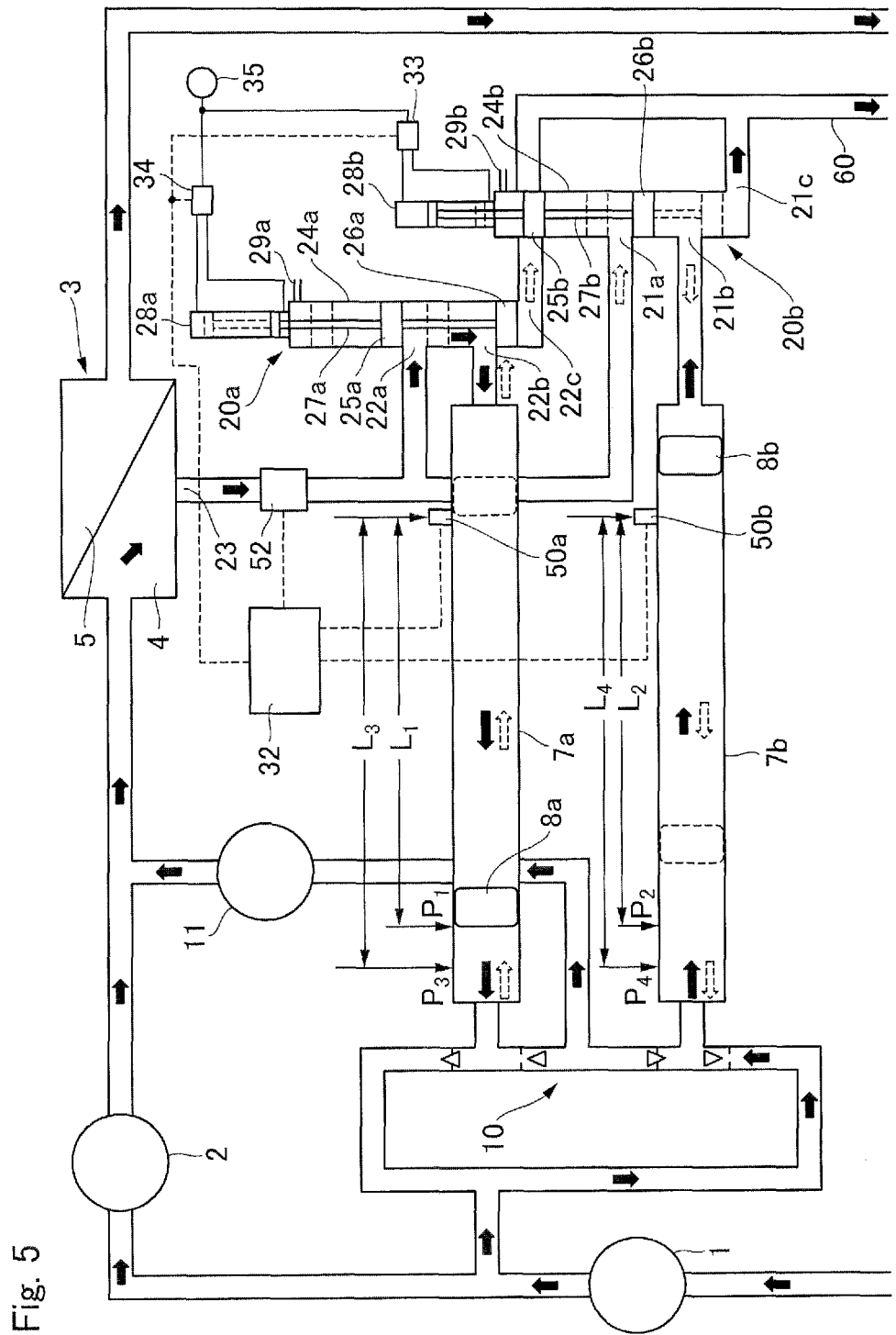
FIG. 5 is a schematic view of a second embodiment of the energy recovery apparatus of the present invention using a seawater desalination system, and shows a condition where a first cylinder device is in the pressure feeding process, and a second cylinder device is in the filling process.

Next, a second embodiment of the present invention is described with reference to FIG. 5. FIG. 5 is a schematic view of a second embodiment of the energy recovery apparatus of the present invention which uses a seawater desalination system, and shows a condition where a first cylinder device is in the pressure feeding process, and a second cylinder device is in the filling process. In FIG. 5, identical code numbers are assigned to members that are identical or equivalent to the members recorded in FIG. 1 to FIG. 4 and FIG. 8 to FIG. 11G, and duplicative description thereof is omitted.

In the structure of the second embodiment shown in FIG. 5, a first clocking initiation position detector 50a is disposed on the outer wall of the first cylinder device 7a relatively toward the other end side, and transmits a signal to the controller 32 upon detecting the piston 8a. P1 is set at a position separated by a distance L1 from the first clocking initiation position detector 50a on the flow path direction regulation means 10 side, and P3 is additionally set at a position separated by a distance L3 on the one end side. In addition, a second clocking initiation position detector 50b is disposed on the outer wall of the second cylinder device 7b relatively toward the other end side, and transmits a signal to the controller 32 upon detecting the piston 8b. P2 is set at a position separated by a distance L2 from the second clocking initiation position detector 50b on the flow path direction regulation means 10 side, and P4 is additionally set at a position separated by a distance L4 on the one end side. Furthermore, a flow path measurement means 52 is disposed on a flow path 51 that communicates with the outlet 23 of the membrane separation device 3; it measures the flow rate of the high-pressure condensed seawater 4, and imparts measured values to the controller 32. The controller 32 obtains the travel speed of each piston 8a and 8b from the other end side to the one end side based on the flow rate of the high-pressure condensed seawater 4 and the respective cylinder cross-sectional areas of the first and second cylinder devices 7a and 7b, and computes in advance from these travel speeds times t1, t2, t3, and t4 for movement from the first and second clocking initiation position detectors 50a and 50b to the distances L1, L2, L3, and L4.

In a condition where the first cylinder device 7a is in the pressure feeding process, and the second cylinder device 7b is in the filling process, when the first clocking initiation position detector 50a imparts a signal of detection to the controller 32 upon movement and passage of the piston 8a from the other end side to the one end side (from right to left in FIG. 5), the controller 32 initiates clocking, and upon movement of the piston 8a to the position of P1 after time t1, the flow path of the second flow path switching device 20b is switched, and the second cylinder device 7b is switched from the filling process to the pressure feeding process. Furthermore, upon movement of the piston 8a to the position of P3 after time t3, the flow path of the first flow path switching device 20a is switched, and the first cylinder device 7a is switched from the pressure feeding process to the filling process. When the first cylinder device 7a enters the filling process, and the second cylinder device 7b enters the pressure feeding process in this manner, and when the second clocking initiation position detector 50b now imparts a signal of detection to the controller 32 upon passage and movement of the piston 8b from the other end side to the one end side (from right to left in FIG. 5), the controller 32 initiates clocking, and upon movement of the piston 8b to the position of P2 after time t2, the flow path of the first flow path switching device 20a is switched, and the first cylinder device 7a is switched from the filling process to the pressure feeding process. Furthermore, upon movement of the piston 8b to the position of P4 after time t4, the flow path of the second flow path switching device 20b is switched, and the second cylinder device 7b is switched from the pressure feeding process to the filling process.

According to the energy recovery apparatus of the second embodiment, it is possible to judge that a piston has moved to a position of set distance when a prescribed time is clocked after initiation of clocking by detection of the piston by a clocking initiation position detector provided in the one cylinder device in the pressure feeding process, and switch the other cylinder device that is in the filling process to the pressure feeding process by switching the flow path of the flow path switching means provided in the other cylinder device prior to termination of the pressure feeding process by the one cylinder device. Thus, the intake ports of the two flow path switching devices that take in high-pressure condensed seawater 4 are not simultaneously obstructed. Furthermore, it is judged that the flow path switching means provided in the other cylinder device has switched flow paths when another prescribed time is clocked, and the one cylinder device is set to the filling process by switching the flow path of the flow path switching device provided in the one cylinder device. By alternately switching the pressure feeding process and the filling process of the two cylinder devices, energy can be efficiently recovered.

With respect to the above-described second embodiment, the first clocking initiation position detector 50a and the controller 32 that clocks the time t1 function as a first judgment means which emits a signal upon judging that the piston 8a of the first cylinder device 7a has moved from the other end side to the one end side to a specified position, and the second clocking initiation position detector 50b and the controller 32 that clocks the time t2 function as a second judgment means which emits a signal upon judging that the piston 8b of the second cylinder device 7b has moved from the other end side to the one end side to a specified position. In addition, the first clocking initiation position detector 50a and the controller 32 that clocks the time t3 function as a second switching judgment means which judges that a flow path of the second flow path switching device 20b has switched so that the other end of the second cylinder device 7b comes into communication with the outlet 23 of the membrane separation device 3 from a condition of communication with the drainage path 60, and the second clocking initiation position detector 50b and the controller 32 that clocks the time t4 function as a first switching judgment means which judges that a flow path of the first flow path switching device 20a has switched so that the other end of the first cylinder device 7a comes into communication with the outlet 23 of the membrane separation device 3 from a condition of communication with the drainage path 60.

Figure 6:
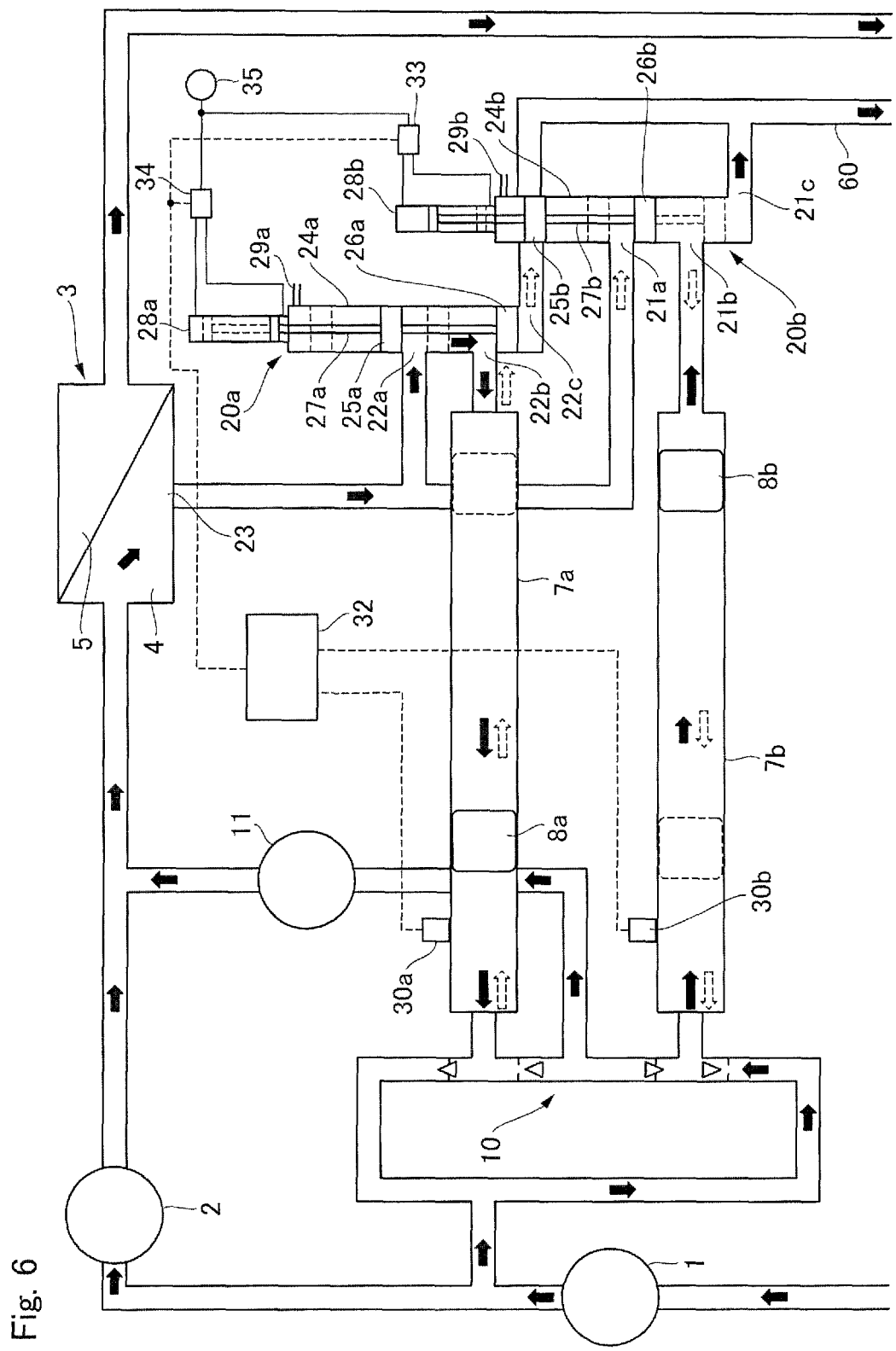
FIG. 6 is a schematic view of a third embodiment of the energy recovery apparatus of the present invention using a seawater desalination system, and shows a condition where a first cylinder device is in the pressure feeding process, and a second cylinder device is in the filling process.

A third embodiment of the present invention is further described with reference to FIG. 6. FIG. 6 is a schematic view of the third embodiment of the energy recovery apparatus of the present invention using a seawater desalination system, and shows a condition where a first cylinder device is in the pressure feeding process, and a second cylinder device is in the filling process. In FIG. 6, identical code numbers are assigned to members that are identical or equivalent to the members recorded in FIG. 1 to FIG. 5 and FIG. 8 to FIG. 11G, and duplicative description thereof is omitted.

In the structure of the third embodiment shown in FIG. 6, a first position detector 30a is disposed on the outer wall of the first cylinder device 7a at one end side, and transmits a signal of detection to the controller 32 upon movement and passage of the piston 8a. In addition, a second position detector 30b is disposed on the outer wall of the second cylinder device 7b at one end side, and transmits a signal of detection to the controller 32 upon movement and passage of the piston 8b. Furthermore, prescribed times are set and stored in the controller 32.

When the first position detector 30a imparts a signal to the controller 32 upon detecting the piston 8a in a condition where the first cylinder device 7a is in the pressure feeding process, and the second cylinder device 7b is in the filling process, the controller 32 switches the second cylinder device 7b from the filling process to the pressure feeding process by switching the flow path of the second flow path switching device 20b, initiates clocking of a first time, and switches the first cylinder device 7a from the pressure feeding process to the filling process by switching the flow path of the first flow path switching device 20a when the first time reaches the prescribed time that was set and stored in advance. When the first cylinder device 7a enters the filling process, and the second cylinder device 7b enters the pressure feeding process in this manner, and when the second position detector 30b now imparts a signal to the controller 32 upon detecting the piston 8b, the controller 32 switches the first cylinder device 7a from the filling process to the pressure feeding process by switching the flow path of the first flow path switching device 20a, initiates clocking of a second time, and switches the second cylinder device 7b from the pressure feeding process to the filling process by switching the flow path of the second flow path switching device 20b when the second time reaches the prescribed time that was set and stored in advance. The prescribed times that are set and stored in advance in the controller 32 are set to be equal to or greater than the time (e.g., 1 second) required for the flow path switching devices 20a and 20b to complete switching.

According to the energy recovery apparatus of the third embodiment, as a result of detection by the position detector provided in the one cylinder device that is in the pressure feeding process, it is possible to switch the other cylinder apparatus that is in the filling process to the pressure feeding process by switching the flow path of the flow path switching means provided in the other cylinder device prior to termination of the pressure feeding process by the one cylinder device, and simultaneous obstruction of the intake ports of the two flow path switching devices does not occur. When the controller initiates clocking as a result of detection by the position detector, and clocks the prescribed time, it is judged that the flow path of the flow path switching means provided in the other cylinder device has switched, and the one cylinder device is set to the filling process by switching the flow path of the flow path switching device provided in the one cylinder device, thereby enabling energy to be efficiently recovered by alternately switching the two cylinder devices between the pressure feeding process and the filling process.

With respect to the above-described third embodiment, the first position detector 30a and the controller 32 function as a first judgment means which emits a signal upon judging that the piston 8a of the first cylinder device 7a has moved from the other end side to the one end side to a specified position, and the second position detector 30b and the controller 32 function as a second judgment means which emits a signal upon judging that the piston 8b of the second cylinder device 7b has moved from the other end side to the one end side to a specified position. In addition, the first position detector 30a and the controller 32 which clocks a prescribed time by a signal that the piston 8a has been detected by the first position detector 8a function as a second switching judgment means which judges that the flow path of the second flow path switching device 20b has switched so that the other end of the second cylinder device 7b has come into communication with the outlet 23 of the membrane separation device 3 from a condition of communication with the drainage path 60, and the second position detector 30b and the controller 32 which clocks a prescribed time by a signal that the piston 8b has been detected by the second position detector 8b function as a first switching judgment means which judges that the flow path of the first flow path switching device 20a has switched so that the other end of the first cylinder device 7a has come into communication with the outlet 23 of the membrane separation device 3 from a condition of communication with the drainage path 60.

Figure 7:
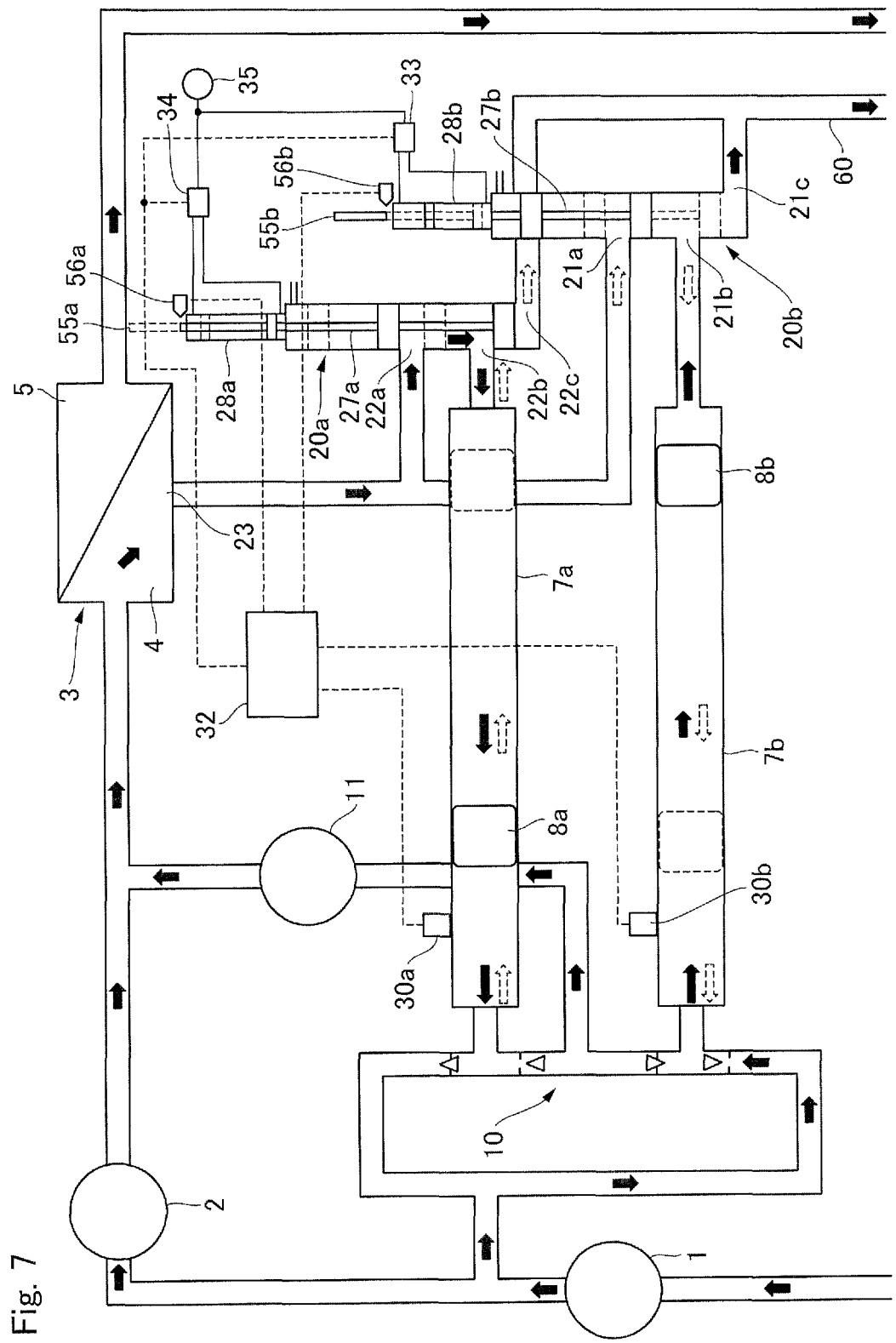
FIG. 7 is a schematic view of a fourth embodiment of the energy recovery apparatus of the present invention using a seawater desalination system, and shows a condition where a first cylinder device is in the pressure feeding process, and a second cylinder device is in the filling process.
Figure 8:
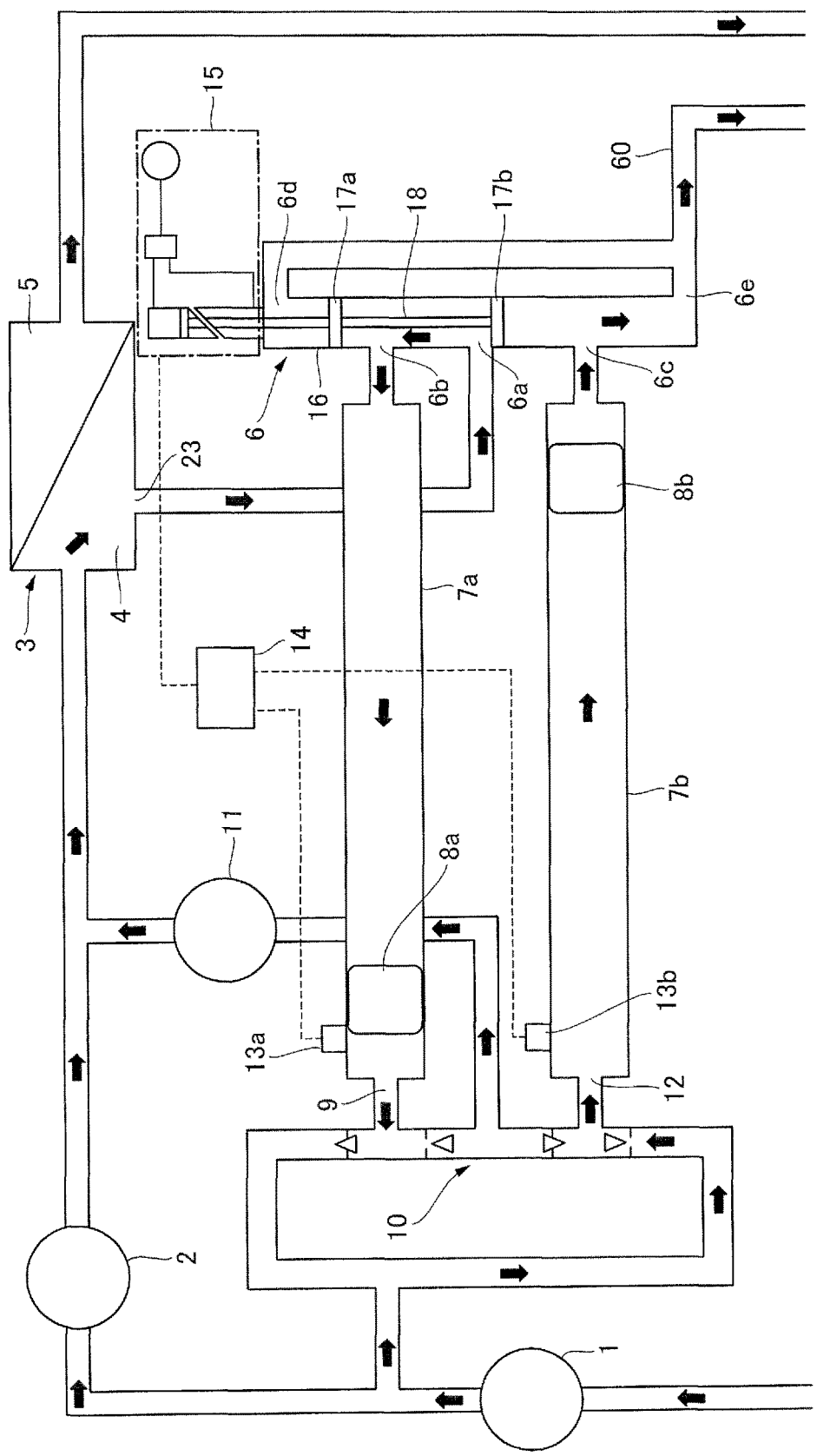
FIG. 8 is a schematic view which shows the flow of water and the configuration of a conventional example of an energy recovery apparatus using a seawater desalination system, and shows a condition where a first cylinder device is in the pressure feeding process, and a second cylinder device is in the filling process.
Figure 9:
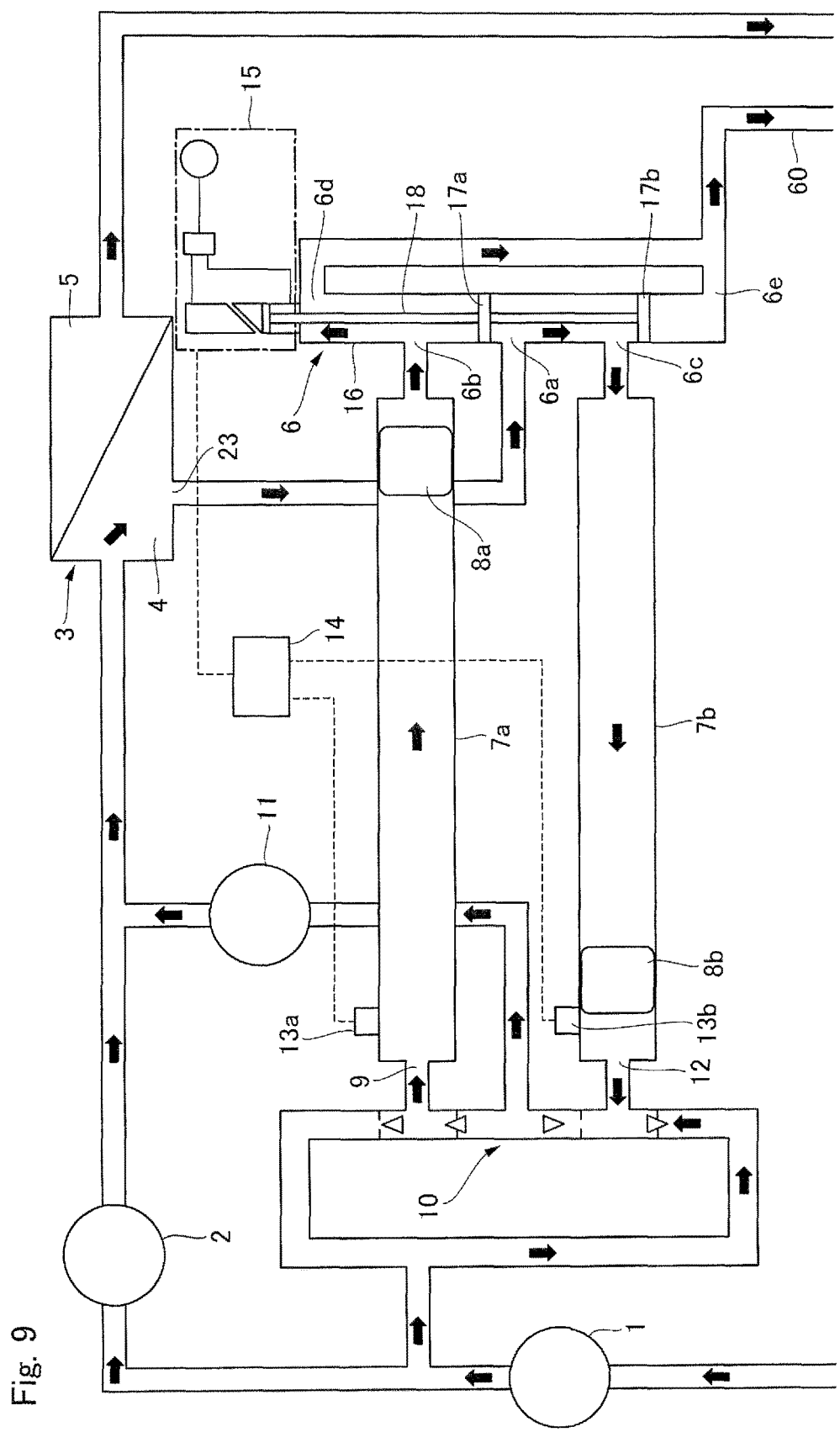
FIG. 9 is a schematic view of FIG. 8, and shows a condition where the first cylinder device is in the filling process, and the second cylinder device is in the pressure feeding process.
Figure 10:
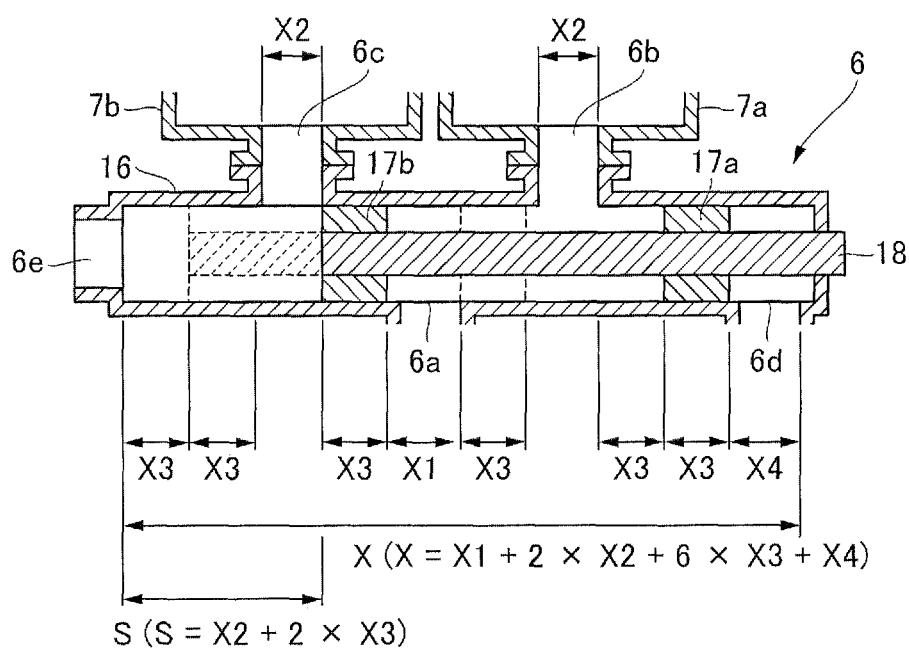
FIG. 10 shows the structure of the flow path switching device of the conventional example of FIG. 8.
Figure 11:
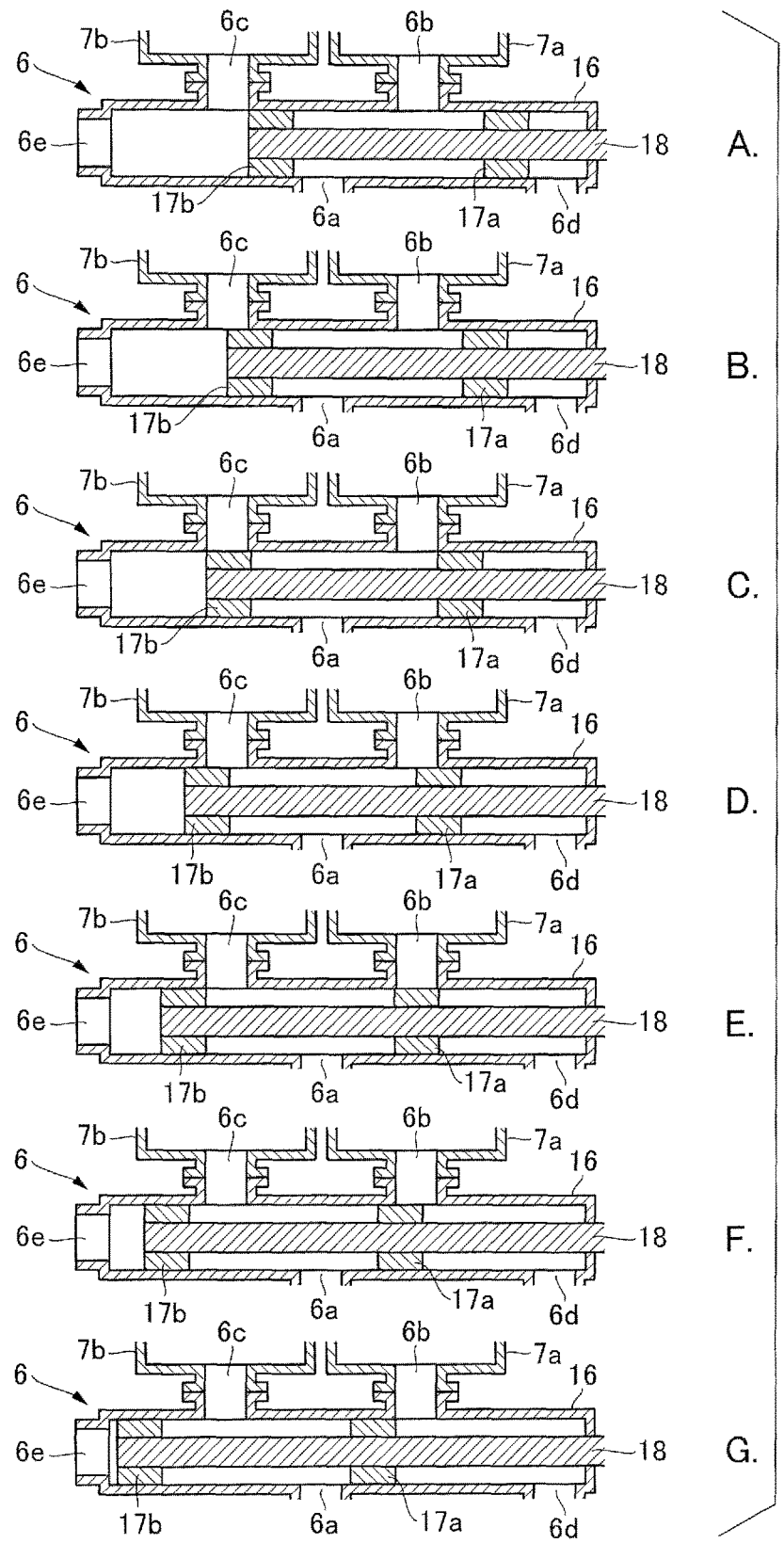
FIG. 11A-FIG. 11G are schematic drawings which show operational relationships between the flow path switching device and the pressure feeding process and the filling process of the first and second cylinder devices of the conventional example of FIG. 8.

A fourth embodiment the present invention is further described with reference to FIG. 7. FIG. 7 is a schematic view of the fourth embodiment of the energy recovery apparatus of the present invention using a seawater desalination system, and shows a condition where a first cylinder device is in the pressure feeding process, and a second cylinder device is in the filling process. In FIG. 7, identical code numbers are assigned to members that are identical or equivalent to the members recorded in FIG. 1 to FIG. 6 and FIG. 8 to FIG. 11G, and duplicative description thereof is omitted.

In the structure of the fourth embodiment shown in FIG. 7, a first position detector 30a is disposed on the outer wall of the first cylinder device 7a at one end side, and transmits a signal of detection to the controller 32 upon movement and passage of the piston 8a. In addition, a second position detector 30b is disposed on the outer wall of the second cylinder device 7b at one end side, and transmits a signal of detection to the controller 32 upon movement and passage of the piston 8b. Furthermore, a first flow path switching detector 56a is provided which detects the position of the piston rod 55a of the drive cylinder device 28a of the first flow path switching device 20a. In addition, a second flow path switching detector 56b is provided which detects the position of the piston rod 55b of the drive cylinder device 28b of the second flow path switching device 20b. The first and second flow path switching detectors 56a and 56b are disposed so as to respectively detect the positions of the piston rods 55a and 55b of the drive cylinder devices 28a and 28b that have entered a condition where the intake ports 22a and 21b and the inflow/outflow ports 22b and 21b of the first and second flow path switching devices 20a and 20b are in full communication.

In a condition where the first cylinder device 7a is in the pressure feeding process, and the second cylinder device 7b is in the filling process, when a signal is imparted to the controller 32 upon detection of the piston 8a by the first position detector 30a, the controller 32 switches the second cylinder device 7b from the filling process to the pressure feeding process by switching the flow path of the second flow path switching device 20b. When the second flow path switching device 20b enters a condition where the intake port 21a and the inflow/outflow port 21b are in full communication, and when a signal is transmitted from the second flow path switching detector 56b, the controller 32 switches the first cylinder device 7a from the pressure feeding process to the filling process by switching the flow path of the first flow path switching device 20a. When the first cylinder device 7a enters the filling process, and the second cylinder device 7b enters the pressure feeding process in this manner, and when a signal is now imparted to the controller 32 upon detection of the piston 8b by the second position detector 30b, the controller 32 switches the first cylinder device 7a from the filling process to the pressure feeding process by switching the flow path of the first flow path switching device 20a. When the first flow path switching device 20a then enters a condition where the intake port 22a and the inflow/outflow port 22b are in full communication, and a signal is transmitted from the first flow path switching detector 56a, the controller 32 switches the second cylinder device 7b from the pressure feeding process to the filling process by switching the flow path of the second flow path switching device 20b.

According to the energy recovery apparatus of the fourth embodiment, as a result of detection by the position detector provided in the one cylinder device that is in the pressure feeding process, it is possible to switch the other cylinder apparatus that is in the filling process to the pressure feeding process by switching the flow path of the flow path switching means provided in the other cylinder device prior to termination of the pressure feeding process by the one cylinder device, and simultaneous obstruction of the intake ports of the two flow path switching devices does not occur. When the flow path switching detector detects a condition of full communication between the intake port and the inflow/outflow port of the flow path switching device provided in the other cylinder device, the flow path of the flow path switching device provided in the one cylinder device is switched, and the one cylinder device enters the filling process, thereby enabling a more reliable alternating switching of the two cylinder devices between the pressure feeding process and the filling process.

With respect to the above-described fourth embodiment, the first position detector 30a and the controller 32 function as a first judgment means which emits a signal upon judging that the piston 8a of the first cylinder device 7a has moved from the other end side to the one end side to a specified position, and the second position detector 30b and the controller 32 function as a second judgment means which emits a signal upon judging that the piston 8b of the second cylinder device 7b has moved from the other end side to the one end side to a specified position. In addition, the first flow path switching detector 56a functions as a first switching judgment means which judges that the flow path of the first flow path switching device 20a has switched so that the other end of the first cylinder device 7a has come into communication with the outlet 23 of the membrane separation device 3 from a condition of communication with the drainage path 60, and the second flow path switching detector 56b functions as a second switching judgment means which judges that the flow path of the second flow path switching device 20b has switched so that the other end of the second cylinder device 7b has come into communication with the outlet 23 of the membrane separation device 3 from a condition of communication with the drainage path 60.

The first judgment means which emits a signal upon judging that the piston 8a of the first cylinder device 7a has moved from the other end side to the one end side to a specified position, and the second judgment means which emits a signal upon judging that the piston 8b of the second cylinder device 7b has moved from the other end side to the one end side to a specified position are not limited to those of the foregoing embodiment, and may conduct discrimination by detecting the movement of the piston by the specified position from the other end side to the one end side, or may conduct discrimination by detecting movement of the piston from the other end side to the one end side by a position different from the specified position, clocking the time for travel to and arrival at the specified position, and inferring that the piston has moved by the specified position after the time has been clocked. Moreover, the first switching judgment means which judges that the flow path of the first switching device 20a has switched so that the other end of the first cylinder device 7a has come into communication with the outlet 23 of the membrane separation device 3 from a condition of communication with the drainage path 60, and the second switching judgment means which judges that the flow path of the second switching device 20b has switched so that the other end of the second cylinder device 7b has come into communication with the outlet 23 of the membrane separation device 3 from a condition of communication with the drainage path 60 are not limited to those of the foregoing embodiment, and may conduct judgment by detecting that the flow path of the flow path switching device has actually switched as in the fourth embodiment; or may conduct judgment by detecting that the piston has moved by a certain position from one end side to the other end side, and inferring that the flow path of the flow path switching device has been switched as in the first embodiment; or may further conduct judgment by detecting that the piston has moved by a certain position from the other end side to the one end side, clocking a prescribed time from that point in time, and inferring that the flow path of the flow path switching device has been switched after the time has been clocked as in the second and third embodiments.

The foregoing description of the conventional example and the descriptions of the embodiments of the present invention all pertain to an energy recovery apparatus applied to a water treatment system for desalination of seawater, but one is not limited to the pertinent example of application. It may be readily understood that the energy recovery apparatus of the present invention may also be applied to a water treatment system for producing clean water suitable for drinking from contaminated water in which contaminants have been dissolved.

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-230357 filed Oct. 20, 2011 which are hereby incorporated by reference herein it their entirety.

What is claimed is:

1. An energy recovery apparatus, comprising:
a first flow path switching device, a first intake port of the first flow path switching device communicating with an outlet of high-pressure condensed seawater of a membrane separation device and a first outtake port of the first flow path switching device communicating with a drainage path;
a second flow path switching device which is provided separately from the first flow path switching device, a second intake port of the second flow path switching device communicates with the outlet of the membrane separation device and a second outtake port of the second flow path switching device communicates with the drainage path;
a first cylinder device which comprises a first piston and communicates with the first flow path switching device without communicating with the second flow path switching device, a first end thereof conducting a first intake from a liquid supply arrangement and a first outflow to a pressure boosting arrangement via a flow path direction regulation arrangement, a second end of the first cylinder device communicating with a first inflow/outflow port of the first flow path switching device;
a second cylinder device which comprises a second piston and communicates with the second flow path switching device without communicating with the first flow path switching device, a first end thereof conducting a second intake from the liquid supply arrangement and a second outflow to the pressure boosting arrangement via the flow path direction regulation arrangement, a second end of the second cylinder device communicating with a second inflow/outflow port of the second flow path switching device;
a first judgment arrangement of the first cylinder device emitting a first signal upon determining that the first piston of the first cylinder device has moved from the second end of the first cylinder device toward the first end of the first cylinder device to a first predetermined position close to the first end of the first cylinder device;
a second judgment arrangement of the second cylinder device emitting a second signal upon determining that the second piston of the second cylinder device has moved from the second end of the second cylinder device toward the first end of the second cylinder device to a second predetermined position close to the first end of the second cylinder device;
a first switching judgment arrangement determining that a first flow path of the first flow path switching device has been switched from a first configuration, in which the second end of the first cylinder device is in communication with the drainage path, to a second configuration, in which the second end of the first cylinder device is in communication with the outlet of the membrane separation device; and
a second switching judgment arrangement determining that a second flow path of the second flow path switching device has been switched from a third configuration, in which the second end of the second cylinder device is in communication with the drainage path, to a fourth configuration, in which the second end of the second cylinder device is in communication with the outlet of the membrane separation device,
wherein, when the second flow path of the second flow path switching device is switched from the third configuration to the fourth configuration according to the first signal and the second switching judgment arrangement determines that the second flow path of the second flow path switching device has been switched from the third configuration to the fourth configuration, the first flow path of the first flow path switching device is switched from the second configuration to the first configuration a blockage of by the communication between the first intake port and the first inflow/outflow port, and
wherein, when the first flow path of the first flow path switching device is switched from the first configuration to the second configuration according to the second signal and the first switching judgment arrangement determines that the first flow path of the first flow path switching device has been switched from the first configuration to the second configuration, the second flow path of the second flow path switching device is switched from the fourth configuration to the third configuration by the blockage of the communication between the second intake port and the second inflow/outflow port.

2. The energy recovery apparatus according to claim 1, wherein a flow path switching speed of the first and second flow path switching devices decreases when the outlet of the membrane separation device communicates with the second ends of the first and second cylinder devices, and increases when the outlet of the membrane separation device communicates with the second ends of the first and second cylinder devices is blocked.

3. The energy recovery apparatus according to claim 1, wherein the first inflow/outflow port is disposed between the first outtake port and the first intake port so that a first cylinder of the first flow path switching device is sequentially provided with the first outtake port, the first inflow/outflow port, the first intake port, and a first adjustment port,
wherein the second inflow/outflow port is disposed between the second outtake port and the second intake port so that a second cylinder of the second flow path switching device is sequentially provided with the second outtake port, the second inflow/outflow port, the second intake port, and a second adjustment port,
wherein the first flow path switching device comprises:
a third piston which is positioned between the first outflow port and the first inflow/outflow port to block the first outflow port and the first inflow/outflow port and which is positioned between the first inflow/outflow port and the first intake port to block the first inflow/outflow port and the first intake port: and
a fourth piston which is positioned substantially closer to the opposite side of the first inflow/outflow port than the first intake port in a first condition where the third piston is positioned between the first outflow port and the first inflow/outflow port,
wherein the second flow path switching device comprises:
a fifth piston which is positioned between the second outflow port and the second inflow/outflow port to block the second outflow port and the second inflow/outflow port and which is positioned between the second inflow/outflow port and the second intake port to block the second inflow/outflow port and the second intake port: and
a sixth piston which is positioned substantially closer to the opposite side of the second inflow/outflow port than the second intake port in a second condition where the fifth piston is positioned between the second outflow port and the second inflow/outflow port, wherein the third piston and the fourth piston are connected by a first piston rod, the first piston rod is moved in a first axial direction of the first cylinder by connection of one end of the first piston rod to a first drive device, and the first adjustment port is disposed at the end portion of the first cylinder on the first intake port side, and wherein the fifth piston and the sixth piston are connected by a second piston rod, the second piston rod is moved in a second axial direction of the second cylinder by connection of one end of the second piston rod to a second drive device, and the second adjustment port is disposed at the end portion of the second cylinder on the second intake port side.

4. The energy recovery apparatus according to claim 3, wherein a first thickness of the fourth piston, in the first axial direction of the first cylinder, is less than a second thickness of the third piston, in the first axial direction of the first cylinder, and a third thickness of the fifth piston, in the second axial direction of the second cylinder, is less than a fourth thickness of the sixth piston, in the second axial direction of the second cylinder.

5. An energy recovery apparatus, comprising:
a first flow path switching device, a first intake port of the first flow path switching device communicating with an outlet of high-pressure condensed seawater of a membrane separation device and a first outtake port of the first flow path switching device communicating with a drainage path;
a second flow path switching device which is provided separately from the first flow path switching device, a second intake port of the second flow path switching device communicates with the outlet of the membrane separation device and a second outtake port of the second flow path switching device communicates with the drainage path;
a first cylinder device which comprises a first piston and communicates with the first flow path switching device without communicating with the second flow path switching device, a first end thereof conducting a first intake from a liquid supply arrangement and a first outflow to a pressure boosting arrangement via a flow path direction regulation arrangement, a second end of the first cylinder device communicating with a first inflow/outflow port of the first flow path switching;
a second cylinder device which comprises a second piston and communicates with the second flow path switching device without communicating with the first flow path switching device, a first end thereof conducting a second intake from the liquid supply arrangement and a second outflow to the pressure boosting arrangement via the flow path direction regulation arrangement, a second end of the second cylinder device communicating with a second inflow/outflow port of the second flow path switching device;
a first position detector that is disposed on of the outer wall at a position close to the first end of the first cylinder device and emits a first signal upon detecting that the first piston of the first cylinder device has moved from the second end of the first cylinder device toward the first end of the first cylinder device to a first predetermined position;
a second position detector that is disposed on the outer wall at a position close to the first end of the second cylinder device and emits a second signal upon detecting that the second piston of the second cylinder device has moved from the second end of the second cylinder device toward the first end of the second cylinder device to a second predetermined position;
a third position detector that is disposed on of the outer wall of the first cylinder device closer to the first end than the first position detector at an interval in the direction of movement of the first piston, and emits a third signal upon detecting that the first piston of the first cylinder device has moved from the first predetermined position toward the first end of the first cylinder device to a third predetermined position;
a fourth position detector that is disposed on the outer wall of the second cylinder device closer to the first end than the second position detector at the interval in the direction of movement of the second piston, and emits a fourth signal upon detecting that the second piston of the second cylinder device has moved from the second predetermined position toward the first end of the second cylinder device to a fourth predetermined position; and
a controller that switches a first flow path of the first flow path switching device from a first configuration, in which the second end of the first cylinder device is in communication with the drainage path, to a second configuration, in which the second end of the first cylinder, device is in communication with the outlet of the membrane separation device, and switches a second flow path of the second flow path switching device from a third configuration, in which the second end of the second cylinder device is in communication with the drainage path, to a fourth configuration, in which the second end of the second cylinder device is in communication with the outlet of the membrane separation device,
wherein the controller switches the second flow path of the second flow path switching device from the third configuration to the fourth configuration according to the first signal, and then switches the first flow path of the first flow path switching device from the second configuration to the first configuration by a blockage of by the communication between the first intake port and the first inflow/outflow port according to the third signal, and
wherein the controller switches the first flow path of the first flow path switching device from the first configuration to the second configuration according to the second signal, and then switches the second flow path of the second flow path switching device from the fourth configuration to the third configuration by the blockage of the communication between the second intake port and the second inflow/outflow port according to the fourth signal.

6. An energy recovery apparatus, comprising:
a first flow path switching device, a first intake port of the first flow path switching device communicating with an outlet of high-pressure condensed seawater of a membrane separation device and a first outtake port of the first flow path switching device communicating with a drainage path;
a second flow path switching device which is provided separately from the first flow path switching device, a second intake port of the second flow path switching device communicates with the outlet of the membrane separation device and a second outtake port of the second flow path switching device communicates with the drainage path;
a first cylinder device which comprises a first piston and communicates with the first flow path switching device without communicating with the second flow path switching device, a first end thereof conducting a first intake from a liquid supply arrangement and a first outflow to a pressure boosting arrangement via a flow path direction regulation arrangement, a second end of the first cylinder device communicating with a first inflow/outflow port of the first flow path switching device;

a second cylinder device which comprises a second piston and communicates with the second flow path switching device without communicating with the first flow path switching device, a first end thereof conducting a second intake from the liquid supply arrangement and a second outflow to the pressure boosting arrangement via the flow path direction regulation arrangement, a second end of the second cylinder device communicating with a second inflow/outflow port of the second flow path switching device;

a first position detector that is disposed on of the outer wall at a position close to the first end of the first cylinder device and emits a first signal upon detecting that the first piston of the first cylinder device has moved from the second end of the first cylinder device toward the first end of the first cylinder device to a first predetermined position;

a second position detector that is disposed on the outer wall at a position close to the first end of the second cylinder device and emits a second signal upon detecting that the second piston of the second cylinder device has moved from the second end of the second cylinder device toward the first end of the second cylinder device to a second predetermined position;

a first flow path switching detector that is disposed on the first flow path switching device and detects that a first flow path of the first flow path switching device has been switched from a first configuration, in which the second end of the first cylinder device is in communication with the drainage path, to a second configuration, in which the second end of the first cylinder device is in communication with the outlet of the membrane separation device;

a second flow path switching detector that is disposed on the second flow path switching device and detects that a second flow path of the second flow path switching device has been switched from a third configuration, in which the second end of the second cylinder device is in communication with the drainage path, to a fourth configuration, in which the second end of the second cylinder device is in communication with the outlet of the membrane separation device; and a controller that switches the first flow path of the first flow path switching device from the first configuration to the second configuration, and switches the second flow path of the second flow path switching device from the third configuration to the fourth configuration, wherein the controller switches the second flow path of the second flow path switching device from the third configuration to the fourth configuration according to the first signal, and then switches the first flow path of the first flow path switching device from the second configuration to the first configuration by a blockage of by the communication between the first intake port and the first inflow/outflow port upon the second flow path switching detector detecting that the second flow path of the second flow path switching device has been switched from the third configuration to the fourth configuration, and wherein the controller switches the first flow path of the first flow path switching device from the first configuration to the second configuration according to the second signal, and then switches the second flow path of the second flow path switching device from the fourth configuration to the third configuration by the blockage of the communication between the second intake port and the second inflow/outflow port according to the fourth signal upon the first flow path switching detector detecting that the first flow path of the first flow path switching device has been switched from the first configuration to the second configuration.

7. An energy recovery apparatus, comprising:

a first flow path switching device, a first intake port of the first flow path switching device communicating with an outlet of high-pressure condensed seawater of a membrane separation device and a first outtake port of the first flow path switching device communicating with a drainage path;

a second flow path switching device which is provided separately from the first flow path switching device, a second intake port of the second flow path switching device communicates with the outlet of the membrane separation device and a second outtake port of the second flow path switching device communicates with the drainage path;

a first cylinder device which comprises a first piston and communicates with the first flow path switching device without communicating with the second flow path switching device, a first end thereof conducting a first intake from a liquid supply arrangement and a first outflow to a pressure boosting arrangement via a flow path direction regulation arrangement, a second end of the first cylinder device communicating with a first inflow/outflow port of the first flow path switching device;

a second cylinder device which comprises a second piston and communicates with the second flow path switching device without communicating with the first flow path switching device, a first end thereof conducting a second intake from the liquid supply arrangement and a second outflow to the pressure boosting arrangement via the flow path direction regulation arrangement, a second end of the second cylinder device communicating with a second inflow/outflow port of the second flow path switching device;

a first judgment arrangement of the first cylinder device emitting a first signal upon determining that the first piston of the first cylinder device has moved from the second end of the first cylinder device toward the first end of the first cylinder device to a first predetermined position close to the first send of the first cylinder device;

a second judgment arrangement of the second cylinder device emitting a second signal upon determining that the second piston of the second cylinder device has moved from the second end of the second cylinder device toward the first end of the second cylinder device to a second predetermined position close to the first end of the second cylinder device;

a first switching judgment arrangement determining that a first flow path of the first flow path switching device has been switched from a first configuration, in which the second end of the first cylinder device is in communication with the drainage path, to a second configuration, in which the second end of the first cylinder device is in communication with the outlet of the membrane separation device; and a second switching judgment arrangement determining that a second flow path of the second flow path switching device has been switched from a third configuration, in which the second end of the second cylinder device is in communication with the drainage path, to a fourth configuration, in which the second end of the second cylinder device is in communication with the outlet of the membrane separation device, wherein, when the second flow path of the second flow path switching device is switched from the third configuration to the fourth configuration according to the first signal and the second switching judgment arrangement determines that the second flow path of the second flow path switching device has been switched from the third configuration to the fourth configuration, the first flow path of the first flow path switching device is switched from the second configuration to the first configuration by a blockage of the communication between the first intake port and the first inflow/outflow port, wherein, when the first flow path of the first flow path switching device is switched from the first configuration to the second configuration according to the second signal and the first switching judgment arrangement determines that the first flow path of the first flow path switching device has been switched from the first configuration to the second configuration, the second flow path of the second flow path switching device is switched from the fourth configuration to the third configuration by the blockage of the communication between the second intake port and the second inflow/outflow port, and wherein the first intake port only utilizes the first flow path switching device and the second intake port only utilizes the second flow path switching device.

* * * * *